US008395796B2

(12) United States Patent
Imamichi

(10) Patent No.: US 8,395,796 B2
(45) Date of Patent: Mar. 12, 2013

(54) INFORMATION PROCESSING APPARATUS, IMAGE PROCESSING APPARATUS, INFORMATION PROCESSING METHOD, AND INFORMATION PROCESSING PROGRAM WHICH OUTPUTS INFORMATION IN THE FORM OF A REPORT

(75) Inventor: Takahiro Imamichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 972 days.

(21) Appl. No.: 11/944,525

(22) Filed: Nov. 23, 2007

(65) Prior Publication Data
US 2008/0180733 A1 Jul. 31, 2008

(30) Foreign Application Priority Data
Dec. 1, 2006 (JP) ................................. 2006-325994

(51) Int. Cl.
*G06K 15/00* (2006.01)
(52) U.S. Cl. ......................................... 358/1.15; 705/38
(58) Field of Classification Search ................. 358/1.15; 705/38
See application file for complete search history.

(56) References Cited

U.S. PATENT DOCUMENTS

| 7,194,691 | B1 * | 3/2007 | Zilka et al. ................ 715/739 |
| 2003/0033241 | A1 * | 2/2003 | Harari ........................ 705/38 |
| 2005/0216421 | A1 * | 9/2005 | Barry et al. ................ 705/64 |
| 2006/0279780 | A1 * | 12/2006 | Anno et al. ................ 358/1.15 |
| 2007/0188824 | A1 | 8/2007 | Imamichi |

FOREIGN PATENT DOCUMENTS

| JP | 2003-296303 | 10/2003 |
| JP | 2005-49995 | 2/2005 |
| JP | 2006-186918 | 7/2006 |

OTHER PUBLICATIONS

JP 2005-049995, IDS, machine translation.*
Office Action issued May 31, 2011, in Japan patent Application No. 2006-325994.

* cited by examiner

*Primary Examiner* — Qian Yang
(74) *Attorney, Agent, or Firm* — Oblon, Spivak, McClelland, Maier & Neustadt, L.L.P.

(57) ABSTRACT

A disclosed information processing apparatus enables the output of various information managed by the apparatus in the form of a report adapted to user requirements in terms of format and output method, by generating report data based on data that is not dependent on any particular report output format or method. The information processing apparatus includes a data input unit, a data processing unit, a data output unit, and a user interface (UI). The data input unit generates data that is not dependent on any particular output format or output method, in accordance with report identifying information received via the UI. The data is processed by the data processing unit in accordance with an output format entered via the UI. The processed data is output by the data output unit in accordance with an output method entered via the UI.

18 Claims, 18 Drawing Sheets

FIG.3A

```
<?xml version ="1.0" encoding="Shift-JIS" ?>
<?xml-stylesheet type="text/xsl" href="rep.xsl" ?>
<header>
  USER LIST REPORT
  <date> 2006/07/21 </data>
</header>
<boby>
  <tag> USER NAME </tag> <tag> ADDRESS </tag>
  <usr> USER A </usr> <add> userA@abc.co.jp </add>
  <usr> USER B </usr> <add> userB@abc.co.jp </add>
  <usr> USER C </usr> <add> userC@abc.co.jp </add>
  ...
</boby>
```
~31

■LOGICAL REPORT DATA:

CONSISTS OF STRUCTURED DATA (VECTOR DATA), SUCH AS XML, PDF, OR PDL

USER LIST REPORT    2006/07/21

| USER NAME | ADDRESS |
|---|---|
| USER A | userA@abc.co.jp |
| USER B | userB@abc.co.jp |
| USER C | userC@abc.co.jp |
| ... | |

■PHYSICAL REPORT DATA:

CONSISTS OF IMAGE, SUCH AS BITMAP DATA (RASTER DATA), AND E-MAIL TEXT THAT USER FINALLY VIEWS

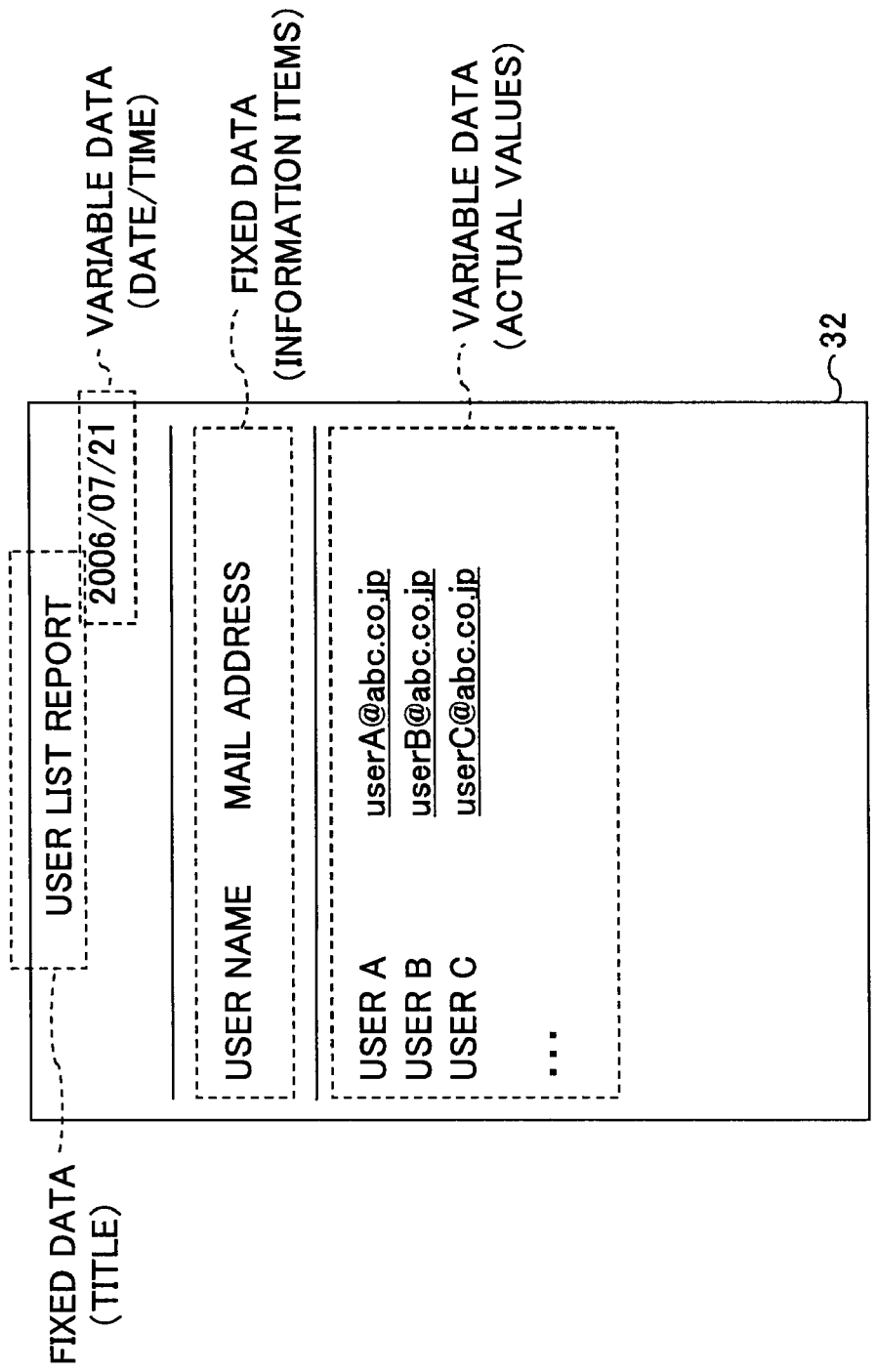

FIG.13

| REPORT TITLE | REPORT DATA GENERATION BLOCK (GENERATION PROGRAM) |
|---|---|
| USER LIST | REPORT DATA GENERATION PROGRAM A |
| SP INFORMATION LIST | REPORT DATA GENERATION PROGRAM B |
| MACRO LIST | REPORT DATA GENERATION PROGRAM C |
| ... | ... |

52t

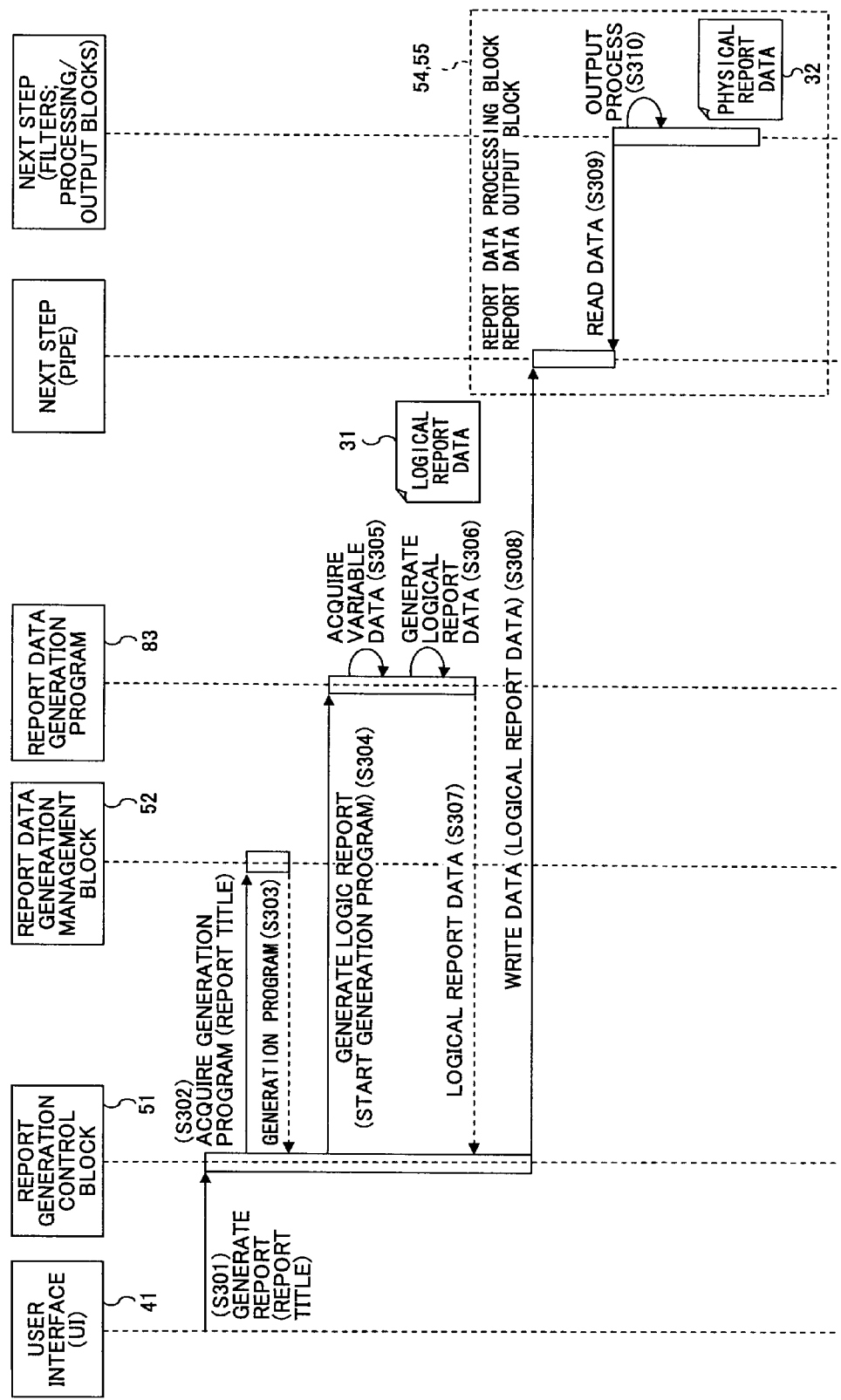

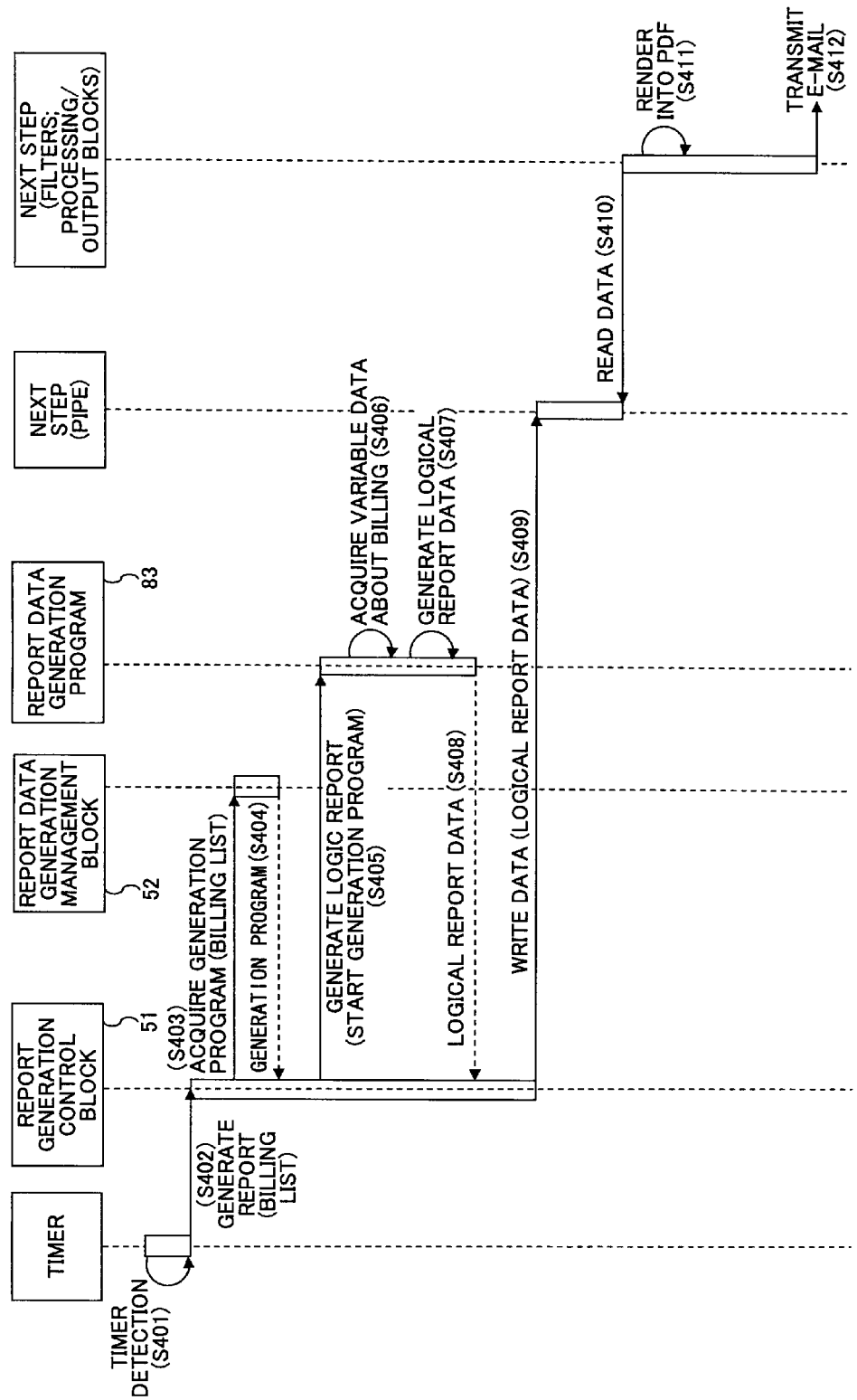

INFORMATION PROCESSING APPARATUS, IMAGE PROCESSING APPARATUS, INFORMATION PROCESSING METHOD, AND INFORMATION PROCESSING PROGRAM WHICH OUTPUTS INFORMATION IN THE FORM OF A REPORT

BACKGROUND OF THE INVENTION

1. Field of the Invention

The present invention relates to an information processing apparatus capable of outputting various information managed by the apparatus in the form of a report.

2. Description of the Related Art

Multifunction printers or peripherals (MFPs), which represent the latest form of image processing apparatuses, provide various application functions, such as copy, facsimile, scanner, and printer functions, and a communication function. This type of image processing apparatuses is used not only in the context of a one-to-one relationship with a user, but increasingly in a one-to-N relationship. In the latter case, the apparatus is connected, via a network, to multiple personal computers as user terminals, or information processing apparatuses with a communication function, such as various management servers, thereby functioning as a component of a system. Thus, the modern image processing apparatuses such as the MFPs are capable of managing and manipulating various information, such as user information, as well as apparatus-specific information, in order to provide useful services to users.

For this purpose, the latest image processing apparatuses are equipped with a function to output a report that allows users to readily monitor various information managed by the apparatus. For example, Japanese Laid-Open Patent Application No. 2006-186918 proposes an image processing apparatus in which report data is generated and printed using the fonts for its printer function.

However, such conventional report output methods have the following problems.

Firstly, since a report-output format, such as layout, is already uniquely determined for each type of information, the user is unable to obtain an output in a desired layout or data format, such as in a gathered or "multiple-pages-into-one" layout, or in the PDF (Portable Document Format) format, for example.

Secondly, since a report-output method is uniquely determined for each type of information, a user cannot choose a desired output method, such as electronic mail transmission.

SUMMARY OF THE INVENTION

It is therefore a general object of the present invention to provide an apparatus, method, and program by which the aforementioned problems can be eliminated. A more specific object of the present invention is to provide an information processing apparatus, image processing apparatus, information processing method, and information processing program in which, with regard to various information managed by the apparatus, a report output is made based on data that is not dependent on any particular report output format or output method, so that the report can be obtained in a format and by a method desired by the user.

In one aspect, the invention provides an information processing apparatus configured to output information managed by the apparatus in the form of a report. The apparatus comprises a data input unit; a data processing unit; a data output unit; and an interface configured to receive settings for controlling the data input unit, the data processing unit, and the data output unit. The data input unit is configured to generate report data that is not dependent on any particular output format or output method, in accordance with report identifying information received via the interface. The data processing unit is configured to process the report data delivered from the data input unit in accordance with a report output format received via the interface. The data output unit is configured to output the report data processed by the data processing unit by a report output method received via the interface.

Thus, the information processing apparatus of the present invention makes it possible to create a report based on data not dependent on any particular report output format or output method. The information processing apparatus therefore enables the output of various information managed by the apparatus in the form of a report in an output format and by an output method requested by a user.

In a preferred embodiment, the report data that is not dependent on any particular output format or output method comprises fixed data associated with the identifying information received via the interface as a setting for controlling the data input unit; variable data acquired from the information processing apparatus when a report output is produced; and tag data.

Thus, the information processing apparatus of the present invention makes it possible to readily incorporate external image data and the like into the report data.

In another preferred embodiment, the data input unit comprises a report data generation program for generating the report data not dependent on any particular output format or output method, in accordance with the report identifying information received via the interface.

Thus, the information processing apparatus of the present invention enables the creation of a report adapted to the report content (i.e., adapted to each particular purpose).

In yet another preferred embodiment of the invention, the data input unit comprises a report data generation program management table in which the report identifying information and the report data generation programs are associated with each other; and a report data generation management unit configured to register another report data generation program in the report data generation program management table, search the table, or delete one of the report data generation programs from the table.

Thus, in the information processing apparatus of the present invention, the report data generation program for generating the report data for each report can be managed and operated using the management table.

In yet another embodiment, the fixed data is set within one of the report data generation programs upon its registration in the report data generation program management table by the report data generation management unit.

Thus, in the information processing apparatus of the present invention, the fixed data can be set (embedded in a format) in advance in accordance with a report content (i.e., for an individual purpose), whereby improved report output processing rates can be achieved (i.e., the time required for producing a report output can be reduced).

In yet another preferred embodiment, the report data generation management unit registers another report data generation program in the report data generation program management table upon starting or installation of a module having the other report data generation program in the information processing apparatus.

Thus, in the information processing apparatus of the present invention, by providing components having report data generation programs that are configured to be plugged into the information processing apparatus, report output function extensions can be readily made.

In yet another preferred embodiment, the report data generation management unit deletes one of the report data generation programs from the report data generation program management table upon terminating or uninstallation of a module having the one of the report data generation programs from the information processing apparatus.

Thus, in the information processing apparatus of the present invention, a report output function can be readily deleted.

In yet another preferred embodiment, the data input unit comprises a report generation control unit configured to control processes involving making a request to the report data generation management unit to acquire a report data generation program based on the report identifying information received via the interface, generating the report data not dependent on any particular output format or output method using the report data generation program acquired, and transmitting the generated report data to the data processing unit.

Thus, in the information processing apparatus of the present invention, the input step can be implemented without being influenced by a function extension or the like in the processing and/or output steps.

In yet another preferred embodiment, the report generation control unit is configured to make a request to the report data generation management unit to acquire a report data generation program, based on the report identifying information received from the interface.

In yet another preferred embodiment, the report generation control unit is configured to acquire and start the report data generation program transmitted from the report data generation management unit.

Thus, the information processing apparatus of the present invention is capable of generating report data adapted to the content of a report.

In yet another preferred embodiment, the report data generation program, when started by the report generation control unit, is configured to transmit the generated report data to the report generation control unit.

In yet another preferred embodiment, the report generation control unit is configured to acquire the report data transmitted from the report data generation program and transmit the acquired report data to the data processing unit.

Thus, in the information processing apparatus of the present invention, the report data can be delivered from the input step to the next step, i.e., the processing step.

In yet another preferred embodiment, the report data generation management unit is configured to, in response to a request from the report generation control unit for acquiring a report data generation program registered in the report data generation program management table, search the report data generation program management table based on the report identifying information transmitted from the report generation control unit, and transmit a relevant report data generation program that has been retrieved to the report generation control unit.

Thus, in the information processing apparatus of the present invention, an appropriate report data generation program for the content of a report can be identified.

In another aspect, the invention provides an image processing apparatus comprising the above information processing apparatus.

Thus, the image processing apparatus of the present invention is capable of implementing similar functional features as those of the foregoing information processing apparatus and therefore providing similar advantageous effects.

In another aspect, the invention provides an information processing method for outputting information managed by an information processing apparatus in the form of a report. The apparatus includes an interface for entering settings for controlling the method. The method comprises the steps of generating data that is not dependent on any particular output format or output method, in accordance with report identifying information received via the interface; processing the generated data in accordance with an output format received via the interface; and outputting the processed data by an output method received via the interface.

In a preferred embodiment, the method comprises a data input procedure, a data processing procedure, and a data output procedure. The data input procedure comprises generating report data not dependent on any particular output format or output method in accordance with report identifying information received via the interface. The data processing procedure comprises processing the report data generated by the data input procedure, in accordance with a report output format received via the interface. The data output procedure comprises outputting the report data processed by the data processing procedure, in accordance with a report output method received via the interface.

Thus, the information processing method enables the creation of a report based on data that is not dependent on any particular report output format or output method. The information processing method therefore enables the output of various information managed by the apparatus in the form of a report in an output format and by an output method requested by a user.

In another aspect, the invention provides an information processing program for causing a computer to carry out the above method.

In a preferred embodiment, the information processing program is configured to cause the computer to function as a data input unit configured to generate report data not dependent on any particular output format or output method in accordance with report identifying information received via the interface; a data processing unit configured to process the report data generated by the data input unit in accordance with a report output format received via the interface; and a data output unit configured to output the report data processed by the data processing unit in accordance with a report output method received via the interface.

Thus, the information processing program of the present invention is capable of causing a computer to create a report based on data that is not dependent on any particular report output format or output method. The information processing program therefore enables the output of various information managed by the apparatus in the form of a report in an output format and by an output method requested by a user.

Thus, in accordance with the information processing apparatus, image processing apparatus, information processing method, and information processing program of the present invention, various information managed by the apparatus can be output in the form of a report in an output format and by an output method requested by a user by generating the report data based on data that is not dependent on any particular report output format or output method data.

Other objects, features, and advantages of the present invention will become apparent from the following description when taken in conjunction with the accompanying drawings.

BRIEF DESCRIPTION OF THE DRAWINGS

FIG. 3A shows logical report data in accordance with the first embodiment of the invention.

FIG. 3B shows physical report data in accordance with the first embodiment of the invention.

FIG. 4 shows various data of which an example of report data according to the first embodiment consists.

FIG. 13 shows an example of the data structure of a report data generation program management table according to the first embodiment.

FIG. 17 shows a sequence chart of a procedure for outputting a report according to the first embodiment.

FIG. 18 shows a sequence chart of an operation for transmitting billing information via electronic mail according to the first embodiment.

DETAILED DESCRIPTION OF THE PREFERRED EMBODIMENTS

In the following, the present invention is described by way of preferred embodiments thereof with reference made to the attached drawings.

First Embodiment

<Hardware Structure>

The hardware structure of an image processing apparatus according to a first embodiment of the present invention is described with reference to FIG. 1.

Figure 1:
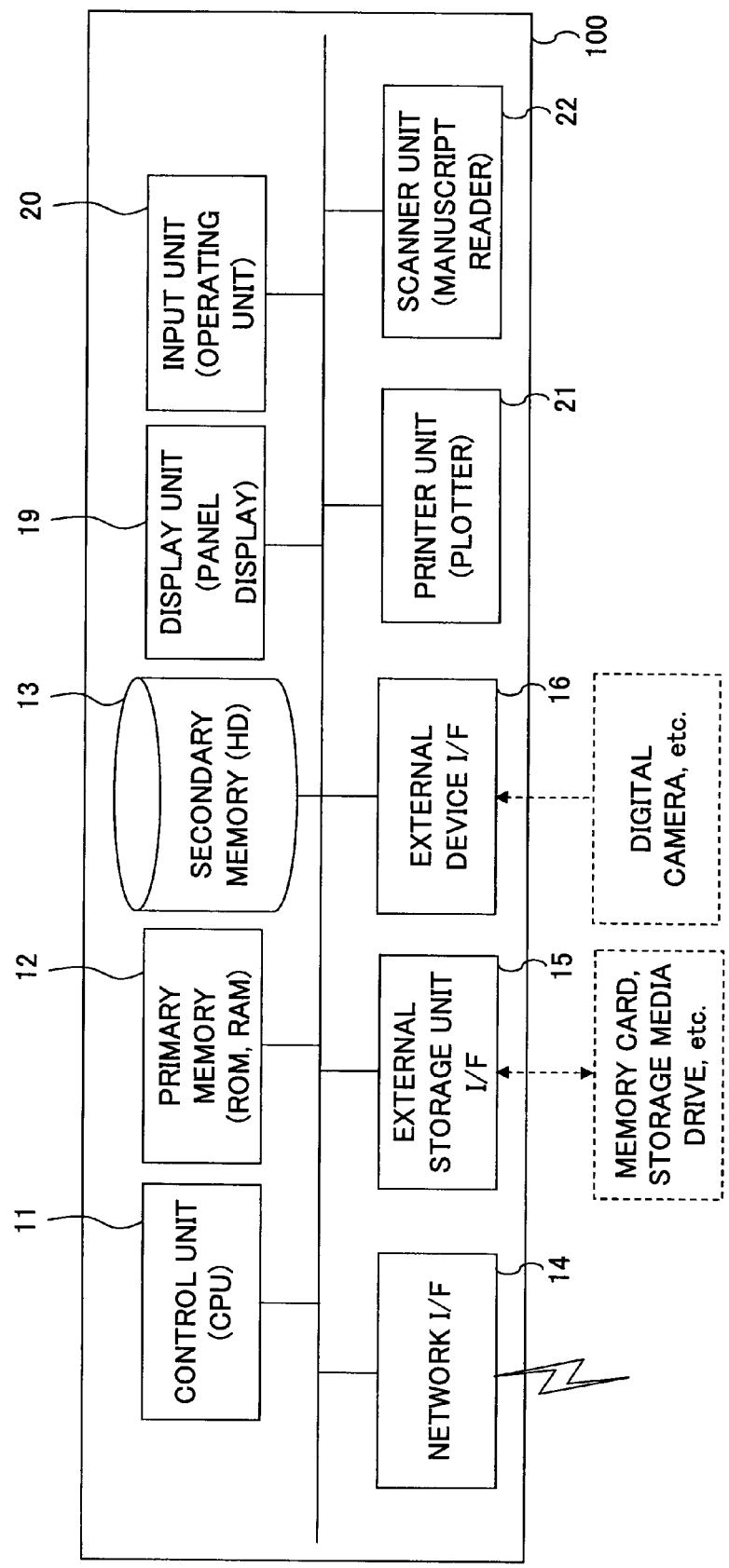
FIG. 1 shows an example of the hardware configuration of an image processing apparatus according to a first embodiment of the present invention.

As shown in FIG. 1, an image processing apparatus 100 comprises a control unit 11, primary storage unit 12, secondary storage unit 13, network I/F 14, external storage unit I/F 15, external device I/F 16, display unit (panel display) 19, input unit (operating unit) 20, printer unit (plotter) 21, and scanner unit (manuscript reader) 22.

The control unit, which includes a CPU (Central Processing Unit) 11, controls the various units of the apparatus and operates or processes data. The control unit 11 includes an arithmetic logic unit that runs a program saved in the primary storage unit 12. The control unit 11 receives data from an input device or a storage device, operates or processes it, and then outputs a result to an output device or a storage device.

The primary storage unit (ROM: Read Only Memory, and RAM: Random Access Memory) 12 stores or temporarily stores programs or data for an OS (Operating System), which is the basic software run by the control unit (CPU) 11, and application software.

The secondary storage unit (HD: Hard Disk) 13 is a storage device for storing data associated with the basic software, i.e., the OS, and application software. The secondary storage unit 13 also stores various information (such as user information) managed by the image processing apparatus 100; it is managed by database (DB) or file system (FS) functions.

The network I/F 14 provides an interface between peripheral devices having a communication function and the image processing apparatus 100, such peripheral devices being connected via a network composed of wire or wireless data transmission lines, such as a LAN (Local Area Network) or a WAN (Wide Area Network).

The external storage unit I/F 15 provides an interface between an external storage device (such as a storage media drive) connected via a data transmission line, such as a USB (Universal Serial Bus) cable, and the image processing apparatus 100.

The external device I/F 16 provides an interface between an external input device (such as a digital camera) connected via a transmission line such as a USB cable, and the image processing apparatus 100.

The image processing apparatus 100 exchanges (i.e., transmits/receives or reads/writes) various data (such as image data) with the outside via the aforementioned interfaces.

The display unit (panel display) 19 and the input unit (operating unit) 20 comprises key switches (hardware keys) and an LCD (Liquid Crystal Display) having a touch panel function (including GUI (Graphical User Interface) software keys). The display unit 19 and the input unit 20 thus provide a user interface (UI) for utilizing the functions provided by the image processing apparatus 100.

The printer unit (plotter) 21 comprises a plotter device that receives image data consisting of CMYK components and outputs (prints) it on a transfer paper (printing paper) by an electrophotographic process (including exposure, latent image formation, development, and transfer steps) involving a laser beam.

The scanner unit (manuscript reader) 22 comprises a line sensor consisting of CCD (Charge Coupled Device) photoelectric conversion elements, an A/D converter, and a drive circuit for driving them. The scanner unit 22 is configured to scan a manuscript set on a manuscript-reading surface (contact glass) to generate 8-bit digital image data for each of R, G, and B. In other words, the scanner unit 22 is a device for reading information from paper media and converting it in an electronic form.

Thus, the image processing apparatus 100 runs programs saved in the storage devices such as the primary storage unit 12 and the secondary storage unit 13, using the control unit (CPU) 11, and sends control signals (instructions) to the individual units. In this way, the functions of the image processing apparatus 100 as a copier, facsimile, scanner, and printer, for example, are realized.

<Problems of Conventional Art>

Figure 2B:
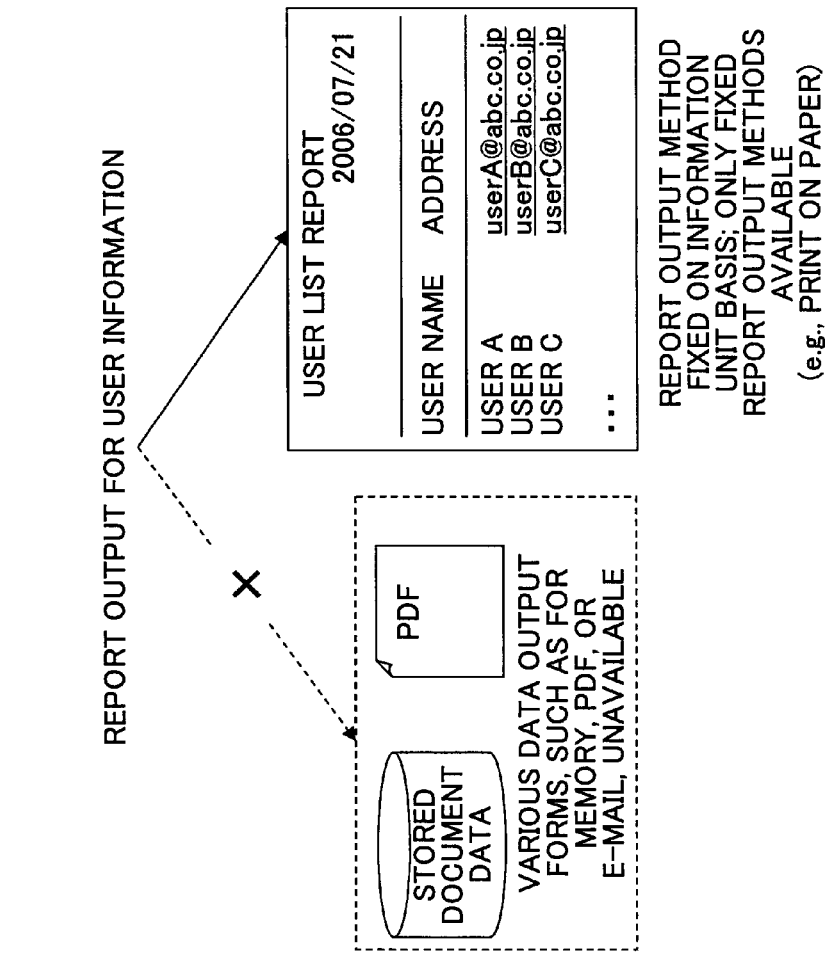
FIG. 2B illustrates another problem of conventional art relating to output method.

In the following, the problems of conventional art that are solved by the present embodiment are discussed with reference to FIGS. 2A and 2B.

Figure 2A:
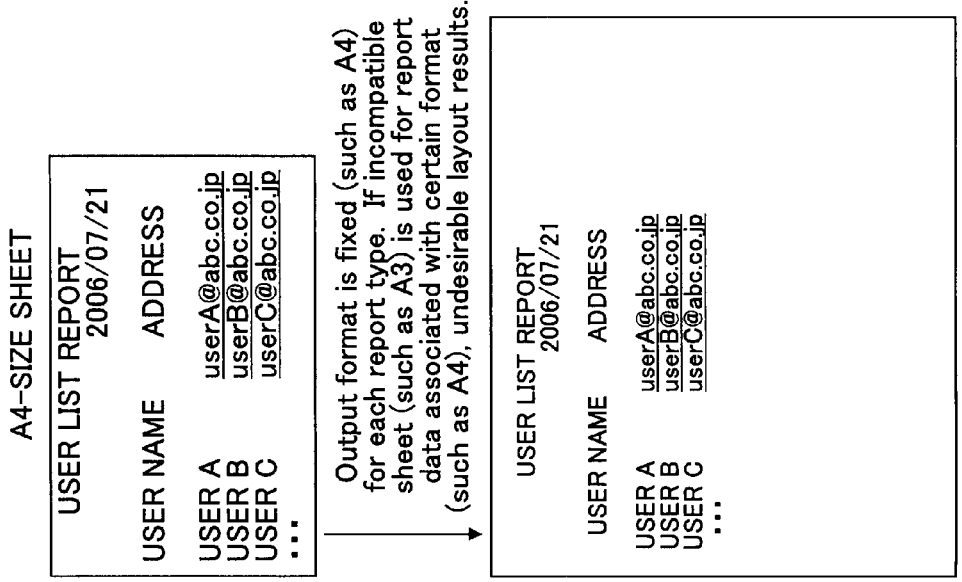
FIG. 2A illustrates one problem of conventional art relating to output format.

FIG. 2A illustrates one problem of conventional art relating to output format. FIG. 2B illustrates another problem of conventional art relating to output method.

Specifically, the two problems of conventional art in connection with the output of various information managed by the apparatus in a report form are the following:

(1) Report Output Format

A unique output format is determined for each type of information, making it impossible for the user to choose a layout or data format as he desires. For example, as shown in FIG. 2A, when a user tries to have a user list report printed on an "A3" paper, the layout for the particular report will not be adapted to the A3 sheet size as long as the relevant output format is fixed for "A4" size, resulting in the A4 report area being printed on an A3 sheet. Thus, the user cannot obtain a report output in a layout adapted to A3 size as he desires.

(2) Report Output Method

Since a unique output method is already determined for each type of information, a user cannot choose an output method by which to obtain an printed report. For example, as shown in FIG. 2B, when a user wishes to output user list report information in the PDF electronic data format, the user list report will not be converted into a PDF format as long as the output method for the relevant information is fixed for printed output. Thus, the user is unable to obtain his report in a PDF electronic data format as he desires.

Thus, in the conventional art, since the report output format and method have been uniquely fixed, a report can only be output in a fixed format or by a fixed method, and the user cannot choose a desired format or output method.

In the present embodiment, in view of the above problems, a report ("physical report data") is generated based on data that is not dependent on any particular report output format or output method ("logical report data"). By thus generating physical report data from logical report data, it becomes possible to output a report in an output format and output method in accordance with the user's demand.

<Data Characteristics of Logical Report Data and Physical Report Data, and Data Conversion>

In the following, logical report data and physical report data for the output of a report according to the present embodiment are described with reference to FIGS. 3 and 4.

FIG. 3A shows logical report data 31 and FIG. 3B shows physical report data 32 in accordance with the first embodiment.

As shown in FIG. 3A, the logical report data 31 consists of data (such as vector data) described by XML (Extensible Markup Language), which is a metalanguage capable of describing the structure of a text by enclosing parts of a document with special character strings called "tags" in the text, where original tags can be designated. While the logical report data 31 shown in FIG. 3A is described by XML, other languages capable of describing a text using a structured data structure, such as PDF and PDL (Page Description Language) may be used. Since the logical report data 31 described by a language with such features has a data structure that is not dependent on any particular report output format or output method, the data can be adapted to a variety of output formats and output methods using a module capable of interpreting the language. The logical report data 31 is not the report data that is finally viewed by a user; it is general-purpose data used for the output of a report within the image processing apparatus 100.

On the other hand, the physical report data 32 shown in FIG. 3B is the report data that is finally viewed by the user in the form of image data, such as bit-map data (raster data) or an electronic mail text. Namely, the physical report data 32 is generated by a module capable of interpreting the description language of the logical report data 31 and output in a user-requested output format and method.

In the following, the characteristics of "fixed data" and "variable data," of which report data is composed and on which attention is focused in order to generate the logical report data 31 in the present embodiment, is described with reference to FIG. 4.

As shown in FIG. 4, report data (i.e., information displayed in a report) consists of fixed data and variable data, each with its own characteristics.

The fixed data refers to the data that, of the information displayed in a report, can be handled as non-varying from the start to the end of activation of a module that outputs the report; it includes the title or logo of the report; copyright notes; and information item titles, for example.

The variable data refers to those data that, of the information displayed in a report, may be changed (or updated) in value from the start to the end of activation of the module; it includes actual data (actual values) corresponding to individual information items; date; and time, for example.

These fixed data and variable data constitute that portion of the report data which is dependent on the content of the report (information items of the report) and not on any particular output format or output method. Furthermore, the variable data is the data for which the latest data needs to be acquired for each corresponding item of information each time a report is output. On the other hand, the fixed data can be unequivocally determined by the content of the report, so that it can be stored in advance as predetermined data.

In the present embodiment, focusing on the aforementioned data characteristics, the logical report data 31 shown in FIG. 3A that is not dependent on any particular report output format or output method is generated on the basis of the fixed data and variable data, in accordance with a predetermined report data generation procedure. In other words, the fixed data and variable data groups are converted into the logical report data 31. In this way, it becomes possible to generate report data (logical report data 31) that is not dependent on any particular report output format or output method.

The aforementioned report data generation procedure may involve, e.g., setting variable data in a report format (template for the logical report data 31) in which fixed data is embedded (retained) in advance. By using such processing procedure, fixed data and variable data can be set within the logical report data 31 at their respective best timings (i.e., at different times for the two kinds of data) in a report output processing, whereby processing time for report output can be reduced and a high-speed output processing can be realized.

Furthermore, since in the present embodiment a report is composed of the fixed data, the variable data, and the tag data, externally entered image data and the like can be readily incorporated into the report data.

<User Interface (UI) for the Setting of Parameters Controlling Data Input, Processing, and Output for Creating a Report>

In the following, a user interface (UI) according to the present embodiment is described with reference to FIG. 5. The interface allows the entry of settings (user requests or settings) for controlling data input, processing, and output in order to produce a report in an output format and by an output method requested by a user, based on the logical report data 31.

Figure 5A:
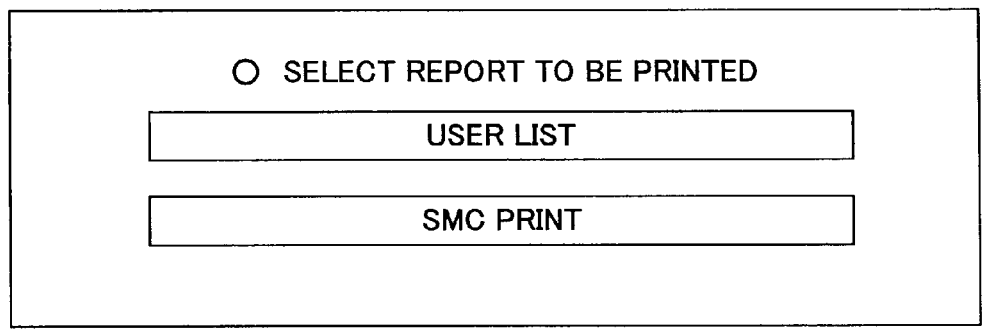
FIG. 5A shows a user interface (UI) according to conventional art.
Figure 5B:
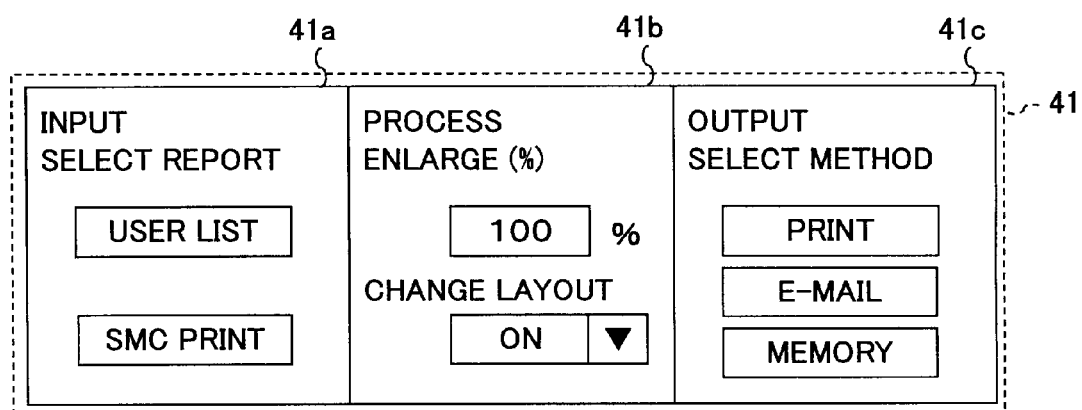
FIG. 5B shows a user interface (UI) according to the first embodiment of the invention.

FIG. 5A shows an example of the display of a conventional user interface (UI). FIG. 5B shows an example of the display of a user interface (UI) 41 of the present embodiment.

As shown in FIG. 5A, in the case of the conventional user interface (UI), since the report output format and output method are uniquely determined, there are displayed only those key switches (software keys) showing report titles for requesting a report output that are associated with each report content (i.e., each unit of information that is output).

On the other hand, in the case of the user interface (UI) 41 of the present embodiment, various settings shown in FIG. 5B can be made in addition to the above report titles indicating each report content. Those settings include "Enlarge" and "Layout change" (including the "multiple-pages-into-one" layout) for the report output format; and "Print" and "Electronic mail" for the output method. In the user interface (UI) 41 of the present embodiment, a series of processes up to the output of a report consists of three steps; i.e., "Input" relating to report data entry; "Process" relating to the processing of entered data in accordance with an output format; and "Output" relating to the output of processed data by an output method. The settings for controlling these three processing steps can be entered via a report content selection screen 41a, an output format selection screen 41b, and an output method selection screen 41c. On the report content selection screen 41a, an information unit item to be output in the form of a report based on the various information managed by the image processing apparatus 100 can be selected. Namely, the report content (such as, e.g., the part of user information that relates to account information) can be set. On the output format selection screen 41b, a report processing format (in terms of, e.g., an enlargement ratio change and/or layout change) can be selected, whereby the report output format can be set. On the output method selection screen 41c, a report output method (such as, e.g., "Print," "Electronic mail," or "Memory") can be selected and set.

Thus, the user interface (UI) 41 of the present embodiment allows the entry of various settings for controlling the individual steps (input, processing, and output) such that a report output can be made in accordance with user requests.

<Software Structure of Image Processing Apparatus 100 and its Basic Processing Procedure>

In the following, a software structure and a basic processing procedure for producing a report output in accordance with the present embodiment is described with reference to FIGS. 6 through 9. In this procedure, the physical report data 32 is output based on the logical report data 31 in accordance with the various settings concerning report content, report output format, and output method that are selected via the report content selection screen 41a, output format selection screen 41b, and output method selection screen 41c of the user interface (UI) 41.

Figure 6:
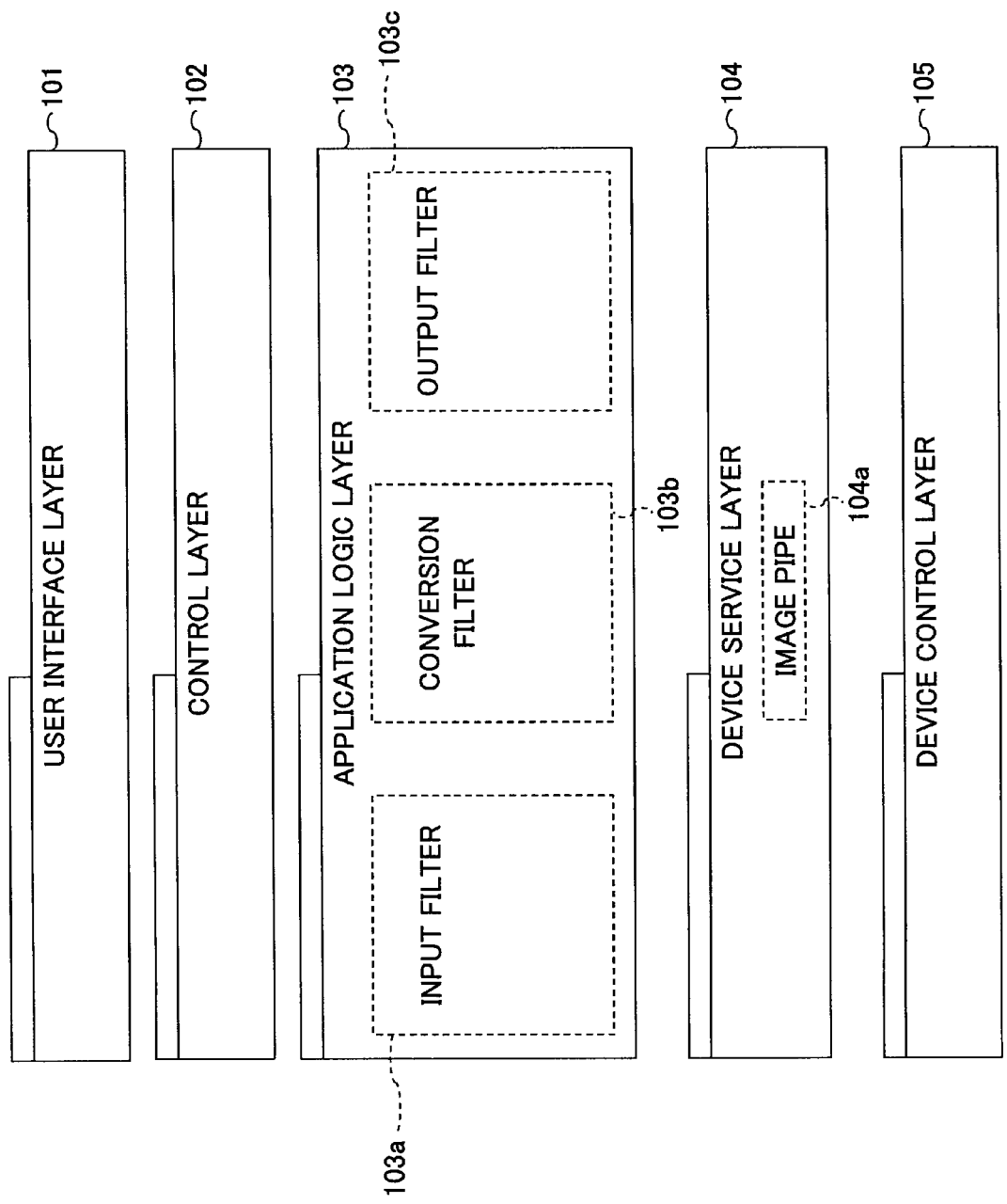
FIG. 6 shows an example of the software configuration of the image processing apparatus according to the first embodiment.

FIG. 6 shows an example of the software structure of the image processing apparatus 100 according to the first embodiment of the invention.

As shown in FIG. 6, the software aspect of the present embodiment comprises a user interface layer 101; a control layer 102; an application logic layer 103; a device service layer 104; and a device control layer 105. In the figure, basically upper layers call up lower layers.

The user interface layer 101 implements a function of receiving a request for executing a function (i.e., any of application functions for copy, facsimile, scanner, and printer, for example). The layer includes, for example, a communication server portion for receiving a request via a network from a user terminal (not shown), and a local user interface (UI) portion for receiving a request entered via the display unit 19 or the input unit 20. A request received by the user interface layer 101 is communicated to the control layer 102.

The control layer 102 implements a function of controlling a process for realizing a requested function. Specifically, the control layer 102 connects filters in the application logic layer 103 depending on a requested function, and controls the execution of that function based on the connected filters. It is noted here that "a function of the image processing apparatus 100" in the present embodiment is synonymous with a single coherent unit of service (during the period from the entry of a request to the delivery of a final output) that the image processing apparatus 100 provides to a user. Thus, the "function" in this software context is synonymous with an application that provides a single coherent unit of service.

The application logic layer 103 implements components each of which realizes part of a function provided by the image processing apparatus 100. Namely, by combining components in the application logic layer 103, a single function is realized. In the present embodiment, each component is referred to as a "filter." This is based on the "pipe-and-filter" software architecture of the image processing apparatus 100.

Figure 7A:
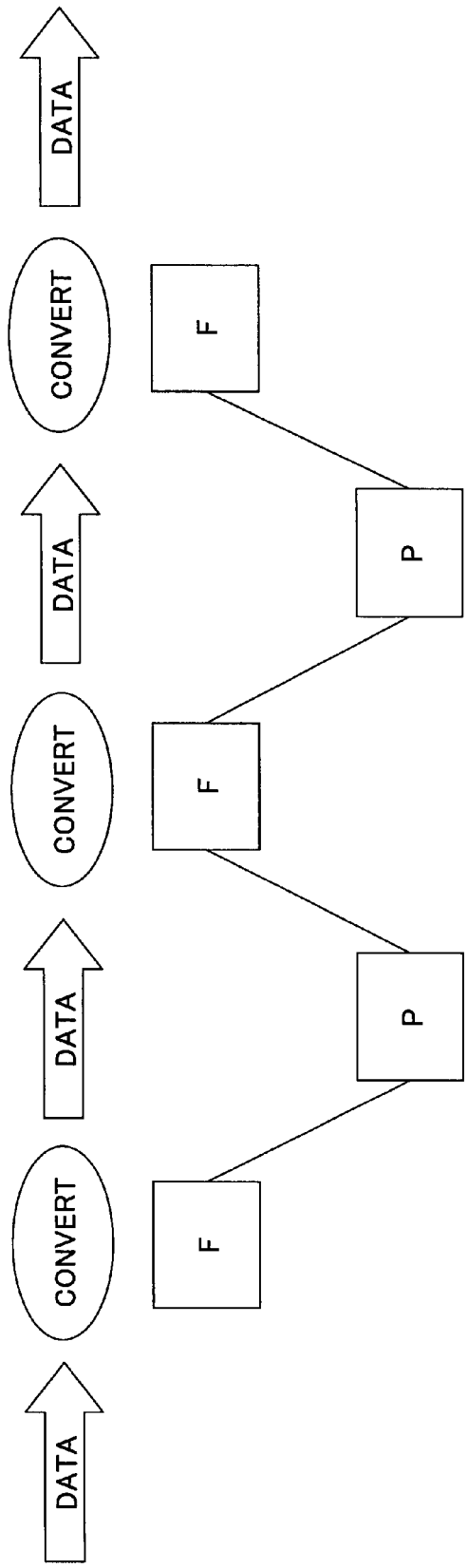
FIG. 7A illustrates the pipe-and-filter concept according to the first embodiment of the invention.
Figure 7B:
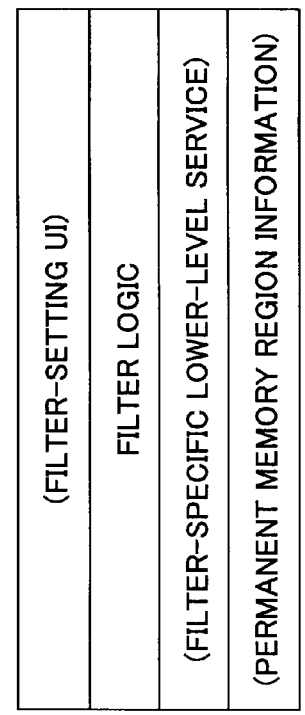
FIG. 7B shows an example of the constituent elements of a filter according to the embodiment.

FIG. 7A shows the pipe-and-filter concept in the first embodiment of the present invention. FIG. 7B shows an example of filter elements.

First referring to FIG. 7A, the pipe-and-filter concept is described. In the figure, "F" designates a filter and "P" designates a pipe. Filters are connected via pipes. A filter performs a conversion on input data and outputs a result. A pipe transmits data delivered from one filter to the next filter. Thus, in the image processing apparatus 100 of the present embodiment, each function is considered to be a procedure of "conversion" of information managed within the image processing apparatus 100 (such as user information or document data, for example). Each of the functions in the image processing apparatus 100 can be generalized as involving the input, processing, and output of information handled within the image processing apparatus 100. Thus, "input," "processing," and "output" are each regarded as a "conversion," and each filter is associated with a software component for realizing a single "conversion." A filter for realizing the input procedure is referred to as an input filter. A filter for realizing the processing procedure is referred to as a conversion filter. A filter for realizing the output procedure is referred to as an output filter. Each filter is independent; basically there is no dependency (calling/called) relationship between filters. Therefore, a filter can be added (installed) or removed (uninstalled) as needed.

Referring back to FIG. 6, an input filter 103a of the application logic layer 103 includes a read filter for controlling the reading of image data by the scanner unit 22 and outputting image data that has been read; a saved document read filter for reading document data (image data) saved in the secondary storage unit 13 and outputting data that has been read; a mail reception filter for receiving electronic mail and outputting data contained in the electronic mail; a FAX reception filter for controlling FAX reception and outputting data that has been received; a PC document reception filter for receiving print data from a user terminal (e.g., PC; not shown) and outputting print data that has been received; and a report filter for outputting various information, such as history information, stored in the image processing apparatus 100 in the form of a table, for example.

Still referring to FIG. 6, the conversion filter 103b includes a document processing filter that performs a predetermined image conversion process (such as for a layout change or enlarging/reduction) on entered data and outputs a result; and a document conversion filter that converts input PostScript data into bit-map data (i.e., rendering).

An output filter 103c includes a print filter for causing the printer unit 21 to output (print) entered data; a saved document registration filter for saving entered data in the secondary storage unit 13; a mail transmission filter for transmitting entered data as an attachment to electronic mail; a FAX transmission filter for FAX transmission of entered data; a PC document transmission filter for transmitting entered data to a user terminal (e.g., PC; not shown); and a preview filter for causing a preview display of entered data on the display unit 19.

The device service layer 104 is where lower-level functions commonly utilized by each filter in the application logic layer 103 are implemented. It includes, for example, an image pipe 104a that realizes the function of a pipe for transmitting output data from one filter to the next filter; and a data management unit that represents various databases, such as a database in which user information is registered and a database in which document or image data are stored.

The device control layer 105 is where a group of program modules called "drivers" for controlling devices (hardware) is implemented. It includes, for example, a scanner control block; a plotter control block; a memory control block; a telephone line control block; and a network control block. Each control block controls the device designated by the name of the control block.

The filters are described in greater detail below. FIG. 7B shows an example of the constituent elements of a filter. As shown, each filter is composed of a filter-setting UI, a filter logic, a filter-specific lower-level service, and permanent storage region information, for example. Of these, filter-setting UI, filter-specific lower-level service, and permanent storage region information may not be included in some filters.

The filter-setting UI consists of a program for causing a screen to appear on the display unit 19 or the like for setting filter implementation conditions and the like. For example, in the case of a read filter, the displayed screen enables the setting of resolution, density, and image type, for example. Given that the display on the display unit 19 is based on the HTML (Hypertext Markup Language) data or script, the filter-setting UI may be composed of HTML data or script.

The filter logic consists of a program implementing a logic for realizing a filter function. Specifically, it realizes a certain filter function by utilizing the filter-specific lower-level service as a filter constituent element, the device service layer 104, or the device control layer 105, in accordance with implementation conditions set via the filter-setting UI. In the case of a read filter, for example, the filter logic corresponds to the logic for the manuscript read control by the scanner unit 22.

The filter-specific lower-level service is a lower-level function (library) necessary for the realization of a filter logic. Namely, it functionally corresponds to the device service layer 104 or the device control layer 105. However, if a service is not used by other filters, it may be implemented as part of the filter; in this case, that part provides the filter-specific lower-level service. For example, while in the case of a read filter the filter-specific lower-level service corresponds to the function for controlling the scanner unit 22, the service is implemented in the device control layer 105 in the form of a scanner control block in the present embodiment. Thus, the implementation of the filter-specific lower-level service in the read filter is not necessarily required.

The permanent storage region information corresponds to schema definition of data that needs to be stored in a nonvolatile memory, such as setting information (such as default values of implementation conditions, for example) pertaining to the filter. Such schema definition is registered in a data management block upon installation of a filter.

In the following, the basic processing procedure carried out in the software structure of the present embodiment is described with reference to FIGS. 8 and 9.

Figure 8:
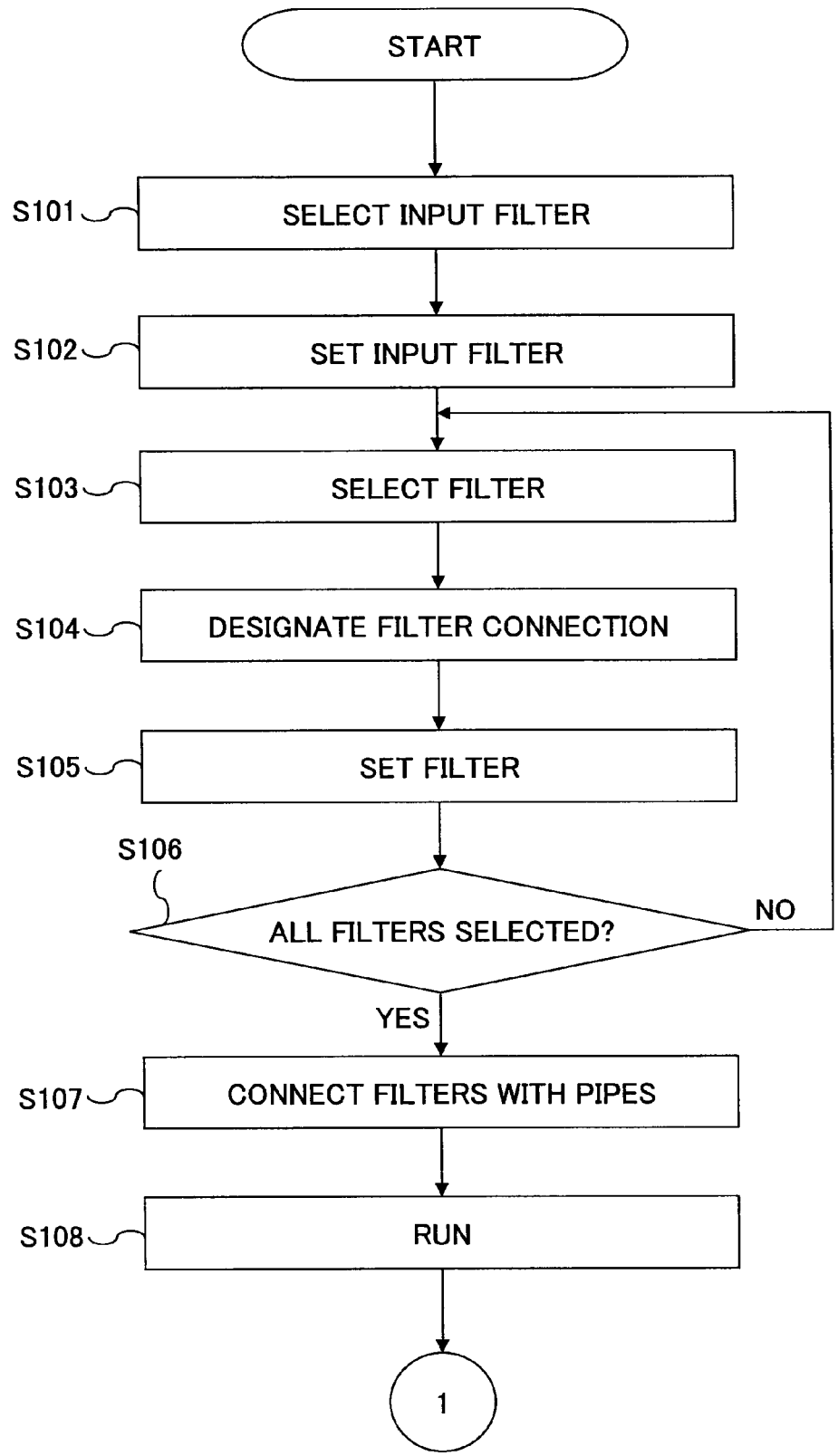
FIG. 8 shows a flowchart of a first basic processing procedure of the image processing apparatus according to the first embodiment.
Figure 9:
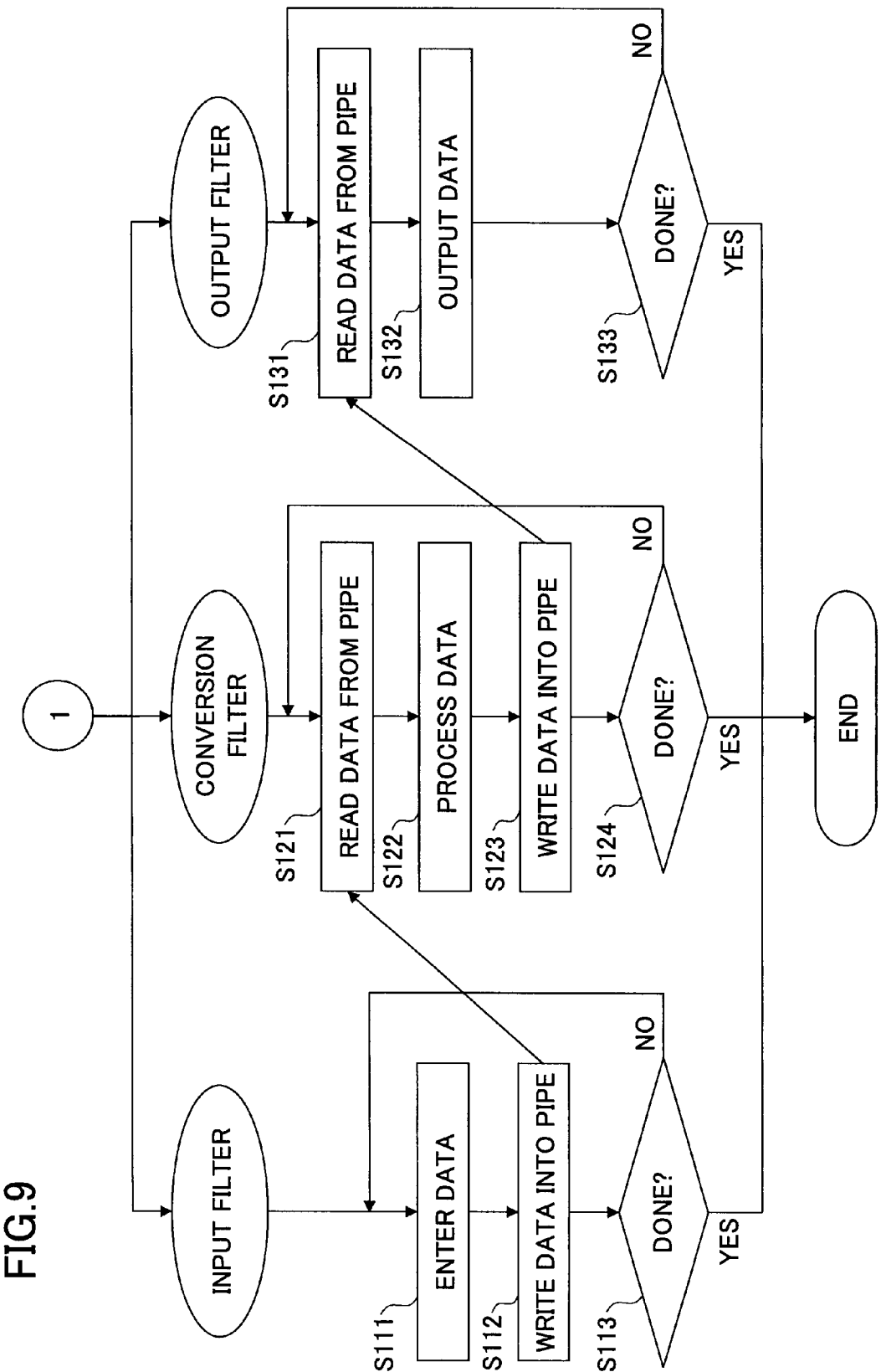
FIG. 9 shows a flowchart of a second basic processing procedure of the image processing apparatus according to the first embodiment.

FIGS. 8 and 9 each show a flowchart of an example of the basic processing procedure performed by the image processing apparatus 100 according to the first embodiment of the invention. The basic processing procedure herein refers to a processing procedure performed when the image processing apparatus 100 realizes a single function.

Referring to FIG. 8, first a user selects an input filter (S101), and then an implementation condition of the selected input filter is set (S102). Similarly, a conversion filter or an output filter is selected (S103), connections between the filters are designated (S104), and an implementation condition is set (S105).

The above operations are carried out via the user interface (UI) 41 shown in FIG. 5B, for example, under the control of the local user interface (UI) portion of the user interface layer 101. In the display example of FIG. 5B, the request input screen consists of selection regions for data input 41a, data processing 41b, and data output 41c. The data input region 41a is for the selection of an input filter; the data processing region 41b is for the selection of a conversion filter; and the data output region 41c is for the selection of an output filter. In each selection region, key switches (including software keys) are provided in association with selectable filters. In the illustrated example, the data input region 41a shows key switches associated with report input filters for a user list and an SMC print. The data processing region 41b shows key switches associated with report conversion filters for enlargement ratio change and layout change. The data output region 41c shows key switches associated with report output filters in terms of "Print," "Electronic mail," and "Memory."

It is also possible to select plural input filters 103a, conversion filters 103b, or output filters 103c for each single function. For example, when a report output needs to involve both printing on a sheet and electronic mail transmission, at least two output filters 103c (a print filter and a mail transmission filter) may be selected.

Referring back to FIG. 8, when the selection of relevant filters is completed ("YES" in S106) and a start button is depressed, the control layer 102 is notified by the user interface layer 101 of the content of a request (such as, e.g., the type of filters and setting information regarding the filters).

The control layer 102, upon notification of the request content from the user interface layer 101, connects the selected filters via pipes (S107). The pipes are actually memories (including the secondary storage unit 13 (HD). The type of memory used differs depending on the filters on either end of the pipe; their correspondence is defined, e.g., in advance in the secondary storage unit 13 of the image processing apparatus 100. Thus, the control layer 102 connects the individual filters via particular pipes based on the defined correspondence. Thereafter, the control layer 102 outputs an implementation request to each filter in a parallel manner (S108). Namely, the filters are called not in order of connection of the filters but virtually simultaneously. This is because the synchronization of the filters is achieved by the pipes. Specifically, after reception of the implementation request from the filter control layer 102, each filter waits until data is placed at the input side of the filter. However, there is no pipe at the input side of the input filter 103a; thus, the input filter 103a starts processing upon reception of the implementation request.

Referring to FIG. 9, the input filter 103a receives data via an input device (S111), and outputs the data to the pipe connected on its output side (S112). In a case where the data is entered in plural portions (such as when plural manuscripts are scanned), the input and output of data to and from the pipe are repeated. Upon completion of the processing of the entire input data ("YES" in S113), the process by the input filter 103a is over.

Upon detection of the input of data in the pipe connected at the input side, the conversion filter 103b initiates processing. First, it reads the data from the pipe (S121) and performs an image processing on the data (S122). Then, the filter outputs the data obtained as a result of the processing to the pipe connected at the output side (S123). When the processing is performed on all of the data entered in the pipe at the input side ("YES" in S124), the processing by the conversion filter 103b is over.

Upon detection of the input of data in the pipe connected at the input side, the output filter 103c initiates processing. First, it reads the data from the pipe (S131) and then outputs the data using an output device (S132). When the processing has been performed on all of the data entered in the pipe on the input side ("YES" in S133), the processing by the output filter 103c is over.

<Report Output Function Based on the Pipe-and-Filter Concept>

A case is considered below where the report output function of the present embodiment is realized based on the above-described pipe-and-filter software structure and the basic processing procedure. In order to realize the report output function, the input, conversion (processing), and output filters are implemented. Specifically, as the input filter 103a, a report input filter (data input unit) is implemented that acquires the latest variable data (actual values) and generates, based on the acquired variable data and the fixed data held in advance, the logical report data 31 in accordance with a predetermined report data generation procedure. As the conversion filter 103b, a report conversion filter (data processing unit) is implemented that processes the logical report data 31 in accordance with an output format that has been set. And as the output filter 103c, a report output filter (data output unit) is implemented that outputs the processed data in the form of the physical report data 32 by an output method that has been set. Then, these individual filters are connected via pipes.

As a result, the logical report data 31 generated by the report input filter 103a (data input unit) can be transmitted to the next step, i.e., the report conversion filter 103b (data processing unit). The data processed by the report conversion filter 103b (data processing unit) can then be transmitted to the report output filter 103c (data output unit) in the next step. Thus, the function of producing a report output involving the physical report data 32 can be realized.

<Hardware Structure of the Information Processing Apparatus>

Figure 10:
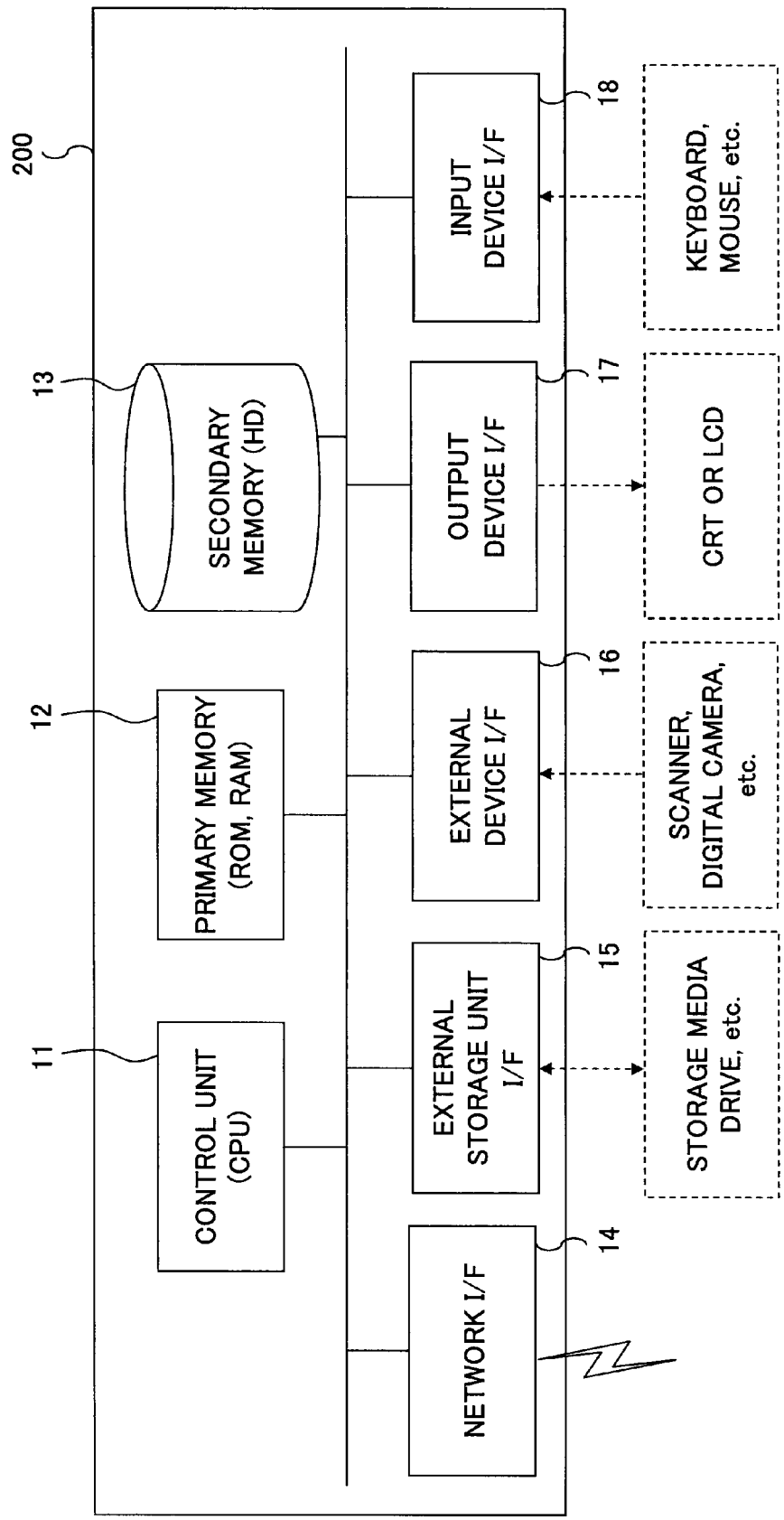
FIG. 10 shows an example of the hardware configuration of an information processing apparatus according to the first embodiment of the present invention.

FIG. 10 shows an example of the hardware structure of an information processing apparatus 200 according to the first embodiment of the present invention.

As shown in FIG. 10, the information processing apparatus 200 comprises a control unit 11; a primary storage unit 12; a secondary storage unit 13; a network I/F 14; an external storage unit I/F 15; an external device I/F 16; an output device I/F 17; and an input device I/F 18. These constituent elements perform functions similar to the corresponding elements of the image processing apparatus 100 and are therefore designated with similar numerals, with their descriptions being omitted. In the following, constituent elements that are different from the elements of FIG. 1 are described.

The output device I/F 17 provides an interface between an output device (such as a CRT (cathode ray tube) or an LCD) connected via a data transmission line, such as a dedicated cable, and the information processing apparatus 200.

The input device I/F 18 provides an interface between an input device (such as a keyboard or mouse) connected via a transmission line, such as a USB cable, and the information processing apparatus 200.

Thus, by carrying out programs stored in storage devices such as the primary storage unit 12 or the secondary storage unit 13, and controlling the individual units, the functions of the information processing apparatus 200 can be realized. The information processing apparatus 200 differs from the image processing apparatus 100 in the characteristics of the input/output devices connected to the apparatus. They are identical in that they both carry out a program using the control unit 11 and control the individual units so as to process various information managed by the apparatus. Therefore, the image processing apparatus 100 and the information processing apparatus 200 share the same minimum constituent hardware elements required for achieving the object of the present invention; i.e., enabling the output of a report in an output format and by an output method requested by a user, which object is achieved by generating a report based on the logical report data 31 that is not dependent on any particular report output format or output method. Therefore, the image processing apparatus 100 described above is considered to be capable of performing similar functions as those of the information processing apparatus 200; thus, the following description applies to both information processing apparatus 100 and 200.

<Major Functional Features and Units Providing the Major Functional Features>

Functional features required for realizing the report output function according to the present embodiment and units providing the functional features are described with reference to FIG. 11 through 15.

Figure 11:
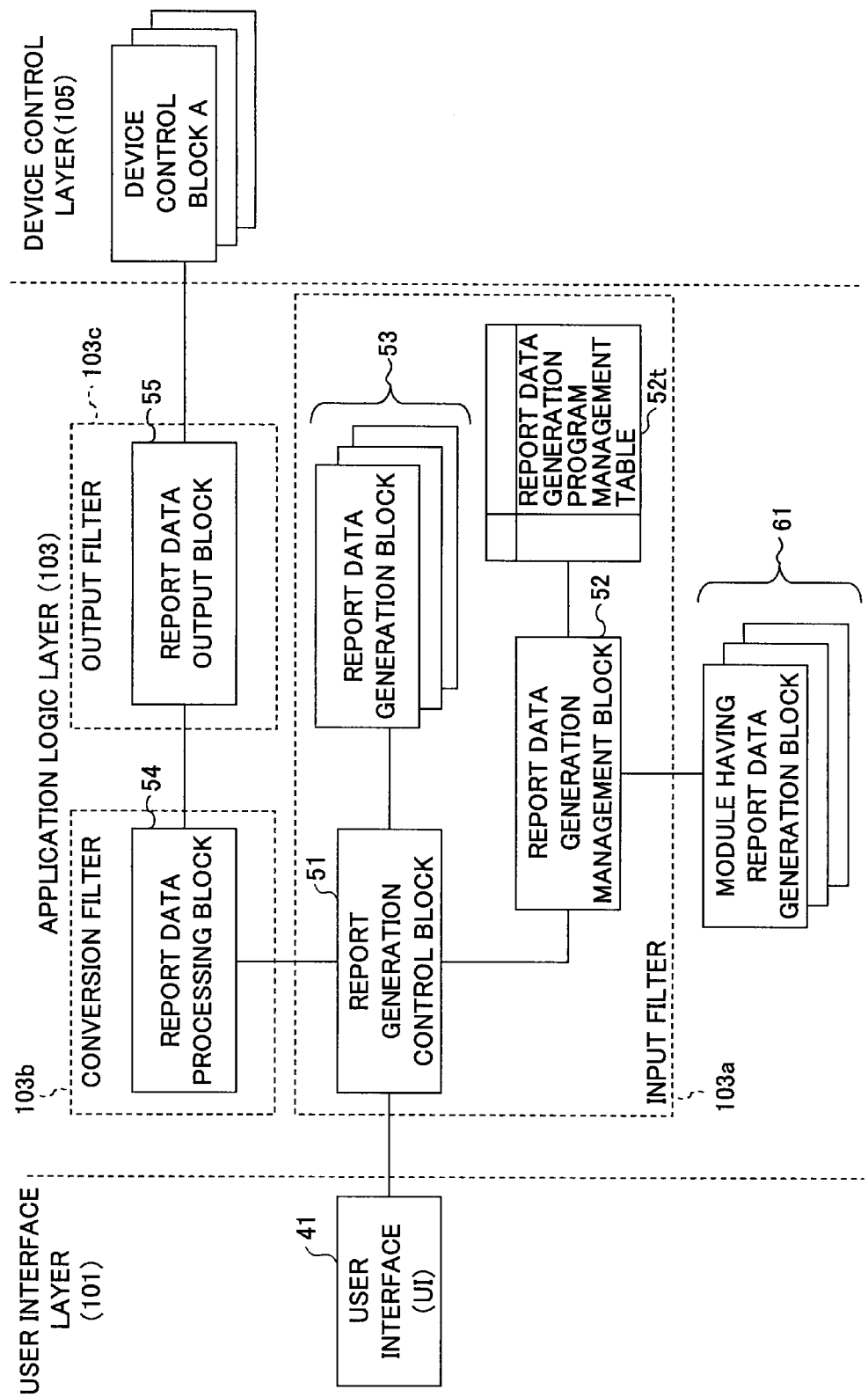
FIG. 11 shows major functional blocks of the first embodiment of the present invention.

FIG. 11 shows an example of the major functional blocks of the first embodiment of the invention.

As shown, the major functional blocks include a report generation control block 51; a report data generation management block 52; a report data generation block 53; a report data processing block 54; and a report data output block 55. The report generation control block 51, report data generation management block 52, and report data generation block 53 are implemented by the report input filter 103a (data input unit). The report data processing block 54 is implemented by the report conversion filter 103b (data processing unit). The report data output block 55 is implemented by the report output filter 103c (data output unit).

The report generation control block 51 involves the function of controlling a series of processes for report generation. Specifically, the processes include the generation of the logical report data 31 in accordance with a report output request entered via the user interface (UI) 41 in the user interface layer 101, by a predetermined report data generation procedure. They also include the writing of the generated logical report data 31 into a pipe so as to transmit the data to the next functional block (report data processing block 54).

The report data generation management block 52 involves the function of managing, using a report data generation program management table 52t, a functional block (report data generation block 53) that generates the logical report data 31. The logical report data 31 contains the fixed data, such as the titles of information items of which a report consists, and the variable data, such as data (actual values) corresponding to such information items, among other various information managed by the apparatus (that can be outputted in the form of a report). The fixed data and the variable data are managed in association with report identifying information (such as a report title). The report data generation program management table 52*t* will be described in detail later with reference to a report data generation management unit 82 shown in FIG. 12.

The report data generation block 53 provides the function of generating the logical report data 31 by collecting variable data, i.e., actual values, and converting such variable data and fixed data, which is retained beforehand, into a general-purpose data format in accordance with a predetermined report data generation procedure. The report data generation block 53 functions upon activation of a report data generation program (i.e., upon its loading (expansion) on the RAM in the primary storage unit 12).

The report data processing block 54, which is the functional block for performing the next step mentioned above with reference to the report generation control block 51, provides the function of processing the generated logical report data 31 in accordance with an output format set by the user.

The report data output block 55 provides the function of outputting the generated physical report data 32 in the form of a report via a predetermined device control unit (such as a network control unit in the case of electronic mail transmission) in the device control layer 105.

Thus, in accordance with the present embodiment, with regard to the function of outputting various information managed by the apparatus in the form of a report, the physical report data 32 is generated based on the logical report data 31 that is not dependent on any particular report output format or output method. Thus, a report output can be obtained in an output format and by an output method requested by a user.

Figure 12:
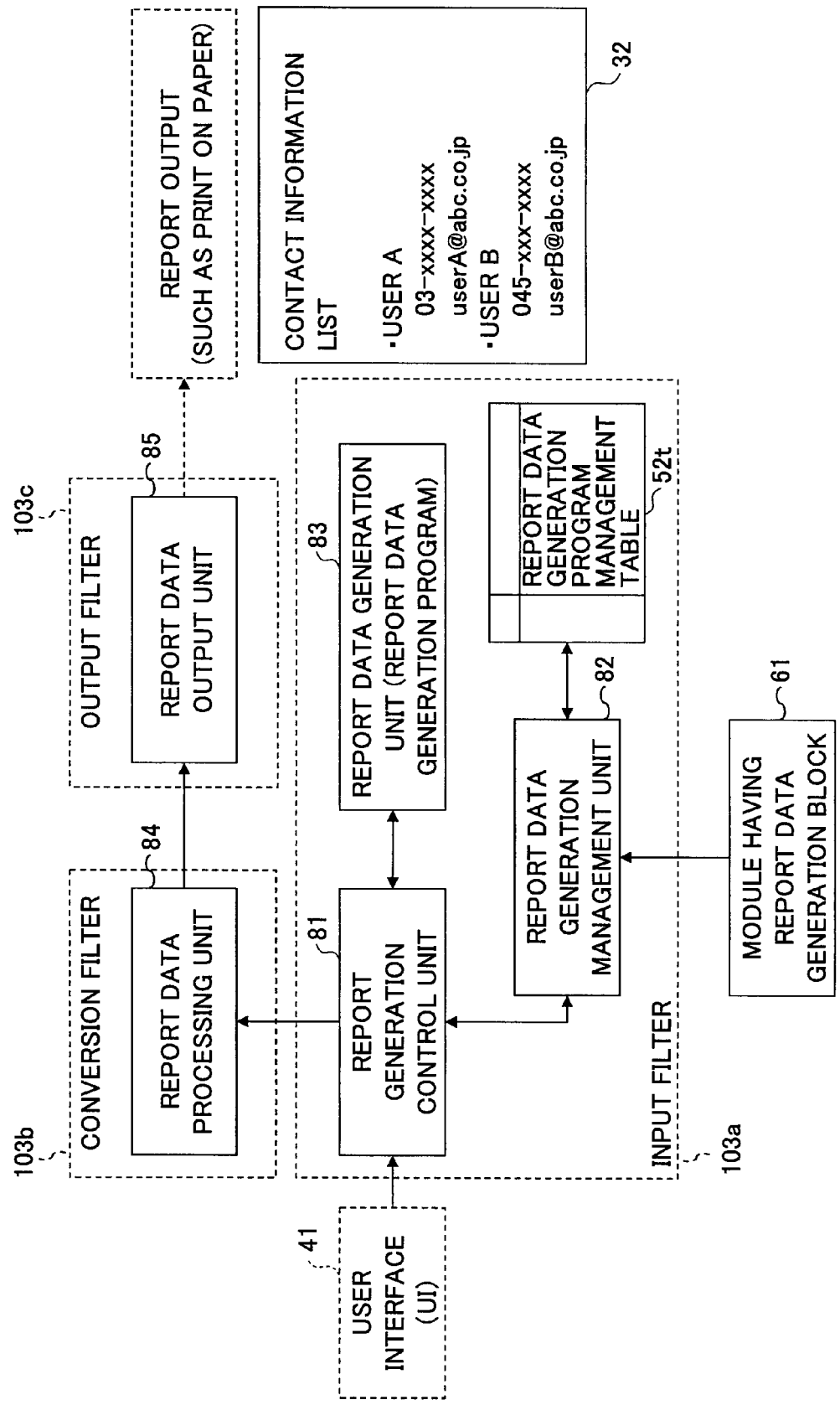
FIG. 12 shows various units configured to perform the major functions of the first embodiment.

FIG. 12 shows an example of the units providing the major functions of the first embodiment of the invention.

As shown in FIG. 12, the units include a report generation control unit 81; a report data generation management unit 82; a report data generation unit 83; a report data processing unit 84; and a report data output unit 85.

The report generation control unit 81 corresponds to the report generation control block 51 of the report input filter 103*a* (data input unit). It controls the series of processes concerning the generation of the logical report data. Specifically, it causes, in accordance with a report output request from the user interface (UI) 41 and via the report data generation management block 52, the report data generation block 53 to generate the logical report data 31. Thereafter, the report generation control unit 81 writes the generated logical report data 31 into a pipe so as to deliver the data to the report data processing block 54 (i.e., the data processing unit of the report conversion filter 103*b*) for the next process step. The user interface (UI) 41 receives various settings concerning the content of a report, output format, output method and the like that the user wishes to designate for a report output, and sends a report generation request to the report generation control block 51 based on the received settings. Specifically, the user interface (UI) 41 receives the settings selected by the user concerning the report input filter 103*a*, report conversion filter 103*b*, and report output filter 103*c*, in terms of report identifying information (such as a report title) and various settings for the output format and output method. These settings are entered via the displayed setting regions shown in FIG. 5B, i.e., the report content selection region 41*a*, output format selection region 41*b*, and output method selection region 41*c*. The report generation control unit 81 thus receives the report identifying information (such as a report title) and various settings concerning the output format and output method via the user interface (UI) 41, and then controls the series of processes for report output by the following processing procedure.

The report generation control unit 81 controls the series of processes involving the generation of the logical report data 31 and the writing of the generated logical report data 31 into a pipe in accordance with the following steps (1) through (4):

(1) Based on the report identifying information (such as a report title) in the report generation request from the user interface (UI) 41, acquires a report data generation program stored in the report data generation block 53 for generating the logical report data 31, via the report data generation management unit 82, which corresponds to the report data generation management block 52;

(2) Starts the report data generation program acquired from the report data generation block 53. Causes the program to function as the report data generation unit 83, and sends a request for generating the logical report data 31 to the report data generation unit 83.

(3) Acquires the generated logical report data 31 from the report data generation unit 83; and (4) Transmits the acquired logical report data 31 to the next unit, i.e., the report data processing unit 84 corresponding to the report data processing block 54 (namely, writes the data into the pipe connecting the report input filter 103*a* and the report conversion filter 103*b* so as to transmit the acquired logical report data 31).

Thus, in accordance with the present embodiment, the report generation control unit 81 enables the carrying out of the input processing without its being influenced by a function extension or the like in the processing and output process steps in the workflow of the series of processes (input, processing, and output) for report output.

The report data generation management unit 82 corresponds to the report data generation management block 52 in the report input filter 103*a* (data input unit). It manages the generation of report data using the report data generation program management table 52*t* shown in FIG. 13, in which each report data generation program for generating the logical report data 31 is associated with the report identifying information (such as a report title).

The data structure of the report data generation program management table 52*t* is described in detail below with reference to FIG. 13. The data in the report data generation program management table 52*t* consists of "Report title" and "Report data generating unit." The "Report title" is an example of the report identifying information generated based on various information managed by the apparatus (that can be output in the form of a report). The "Report data generating unit" indicates report data generation programs for generating the logical report data 31, which includes the fixed data, such as information items and the like of which a report content consists, and the variable data, such as actual values of the information items. In the Report title column, information identifying reports is stored, such as, e.g., "User list," which is generated based on user information; "SP information list," which is generated based on SP information; and "Macro list," which is generated based on macro information. In the Report data generating unit column, there are stored report data generation programs for generating the logical report data 31 individually identified by the report identifying information specified by the aforementioned Report title. For example, as shown in the figure, the report data generation program for generating the logical report data 31 for a user list is a report data generation program A; and the report data generation program for generating the logical report data 31 for an SP information list is a report data generation program B. While in FIG. 13 each of the stored report data generation programs is represented as "Generation program A," "Generation program B," and so on, this is merely for the sake of simplification; in practice, address values or the like in a storage area where a relevant program is saved are saved in a storage area uniquely associated with each report title, which is an example of the report identifying information.

The illustrated report data generation program management table 52*t* is in a table format; this is merely an example of how to indicate the correspondence between each piece of report identifying information and a report data generation program, and of a method of storing such correspondence. Thus, any format may be used as long as the report identifying information can be associated with report data generation programs on a one-to-one relationship and such relationships can be saved.

Thus, in the report data generation program management table 52*t*, the content of each report output (i.e., report title) is uniquely associated with a report data generation program. This means that a generation procedure for generating the logical report data 31 is required for each report content (i.e., on a report-information unit basis).

Thus, the report data generation management unit 82, by referring to the above-described report data generation program management table 52*t* based on the report identifying information (such as a report title) as a key, can identify an appropriate report data generation program for generating the logical report data 31 for a desired report output.

In the report data generation program management table 52*t* shown in FIG. 13, the "Report title," as an example of the report identifying information, is assumed to be in text data format. However, any other format may be used as long as an appropriate associated report data generation program can be specified (For example, a method involving index codes based on a predetermined rule may be used).

Thus, in accordance with the present embodiment, report data generation programs for generating individual items of report data for each report are managed and utilized using the report data generation program management table 52*t*.

Referring back to FIG. 11, upon start of a module 61 (for a desired report output) having a report data generation block 53 (report data generation program), or upon its installation in the information processing apparatus 200, the report data generation management unit 82, in accordance with a request to register a report data generation program for generating the logical report data 31 from the module 61, registers the report identifying information (such as a report title) and the report data generation program specified by the identifying information, in the report data generation program management table 52*t*, thereby updating the management table 52*t*. Furthermore, upon termination of the module 61 or its uninstallation from the information processing apparatus 200, the relevant registered report identifying information (such as a report title) and the report data generation program specified by the identifying information are deleted from the report data generation program management table 52*t*, thereby updating the management table 52*t*. The "module 61" herein refers to, e.g., a module that requests the output of a contact information report listing user mail address information, among other user information.

The report data generation management unit 82 searches the report data generation program management table 52*t* based on the report identifying information received in the form of an acquisition request, in the aforementioned control step (1) performed by the report generation control unit 81. The report data generation management unit 82 then transmits a report data generation program for generating the logical report data 31 identified by the search.

Thus, in the present embodiment, upon start or installation of the module 61 comprising the report data generation block 53 (report data generation program), and in response to a request to register the report data generation program, the report data generation management unit 82 registers the report data generation program in the report data generation program management table 52*t* in association with report identifying information. Then, the report generation control unit 81 can make a request to the report data generation block 53 (report data generation unit 83) to generate the logical report data 31, based on the report identifying information, in the aforementioned control step (2).

The report data generation unit 83 (i.e., the report data generation program that has been started) corresponds to the report data generation block 53 of the report input filter 103*a* (data input unit) for generating the logical report data 31. The report data generation unit 83 collects variable data, i.e., actual values, and converts the collected variable data and the fixed data retained beforehand into a general-purpose data format in accordance with a predetermined report data generation procedure, thereby generating the logical report data 31. The report data generation unit 83 (the started report data generation program), based on the information items determined by the content of the requested report output, collects relevant variable data (actual values), and then sets the collected data (actual values) in a report format in which the fixed data, such as information items, are embedded in advance (such as a template for the logical report data 31 described in an XML format, where the actual data is enclosed with certain tags). By thus carrying out the predetermined report data generation procedure, the report data generation unit 83 generates the logical report data 31 which includes the previously held fixed data and the latest variable data. In this way, the report data generation unit 83 (the started report data generation program), in response to a report generation request made in the aforementioned control step (3) performed by the report generation control unit 81, generates the logical report data 31 and responds (i.e., transmits the logical report data 31) to the report generation control unit 81, which has made the request for generating the generated logical report data 31.

Thus, in accordance with the present embodiment, the logical report data 31, which is general-purpose data, is transmitted to the report conversion filter 103*b* (data processing unit) in the next processing step from the report input filter 103*a* (data input unit) including the report generation control unit 81, report data generation management unit 82, and report data generation unit 83. In the present embodiment, based on the report identifying information (such as a report title) designated via the user interface (UI) 41, the report generation control unit 81 acquires an appropriate report data generation program from the report data generation program management table 52*t*, which is managed by the report data generation management unit 82. The report generation control unit 81 then starts the acquired report data generation program and causes it to function as the report data generation unit 83, and then makes a request for generating a report. The report data generation unit 83 then converts the previously retained fixed data and the variable data updated by information acquisition into a general-purpose data format in accordance with a predetermined report data generation procedure, thereby generating the logical report data 31. The report data generation unit 83 then transmits the generated logical report data 31 to the report generation control unit 81. The report generation control unit 81 then delivers the logical report data 31 to the next process step, i.e., the report data processing unit 84.

The report data processing unit 84 corresponds to the report data processing block 54 of the report conversion filter 103b (data processing unit). It processes the logical report data 31 delivered (transmitted) from the report generation control unit 81 in the form of a report processing request, in accordance with a user-designated output format. Specifically, the report data processing unit 84 reads the logical report data 31 written into the pipe connecting the report input filter 103a and the report conversion filter 103b, in the control step (4) performed by the report generation control unit 81, and then processes the logical report data 31 that it has read, in accordance with user designations concerning the output format settings, such as an enlargement ratio change or layout change (such as a "multiple-pages-into-one" layout change).

The report data output unit 85 corresponds to the report data output block 55 of the report output filter 103c (data output unit). It generates report data adapted to a user-designated output method based on the report data processed by the report data processing unit 84, and then outputs the generated report data as the physical report data 32, via a predetermined device control unit (such as a network control unit in the case of electronic mail transmission). Specifically, the report data output unit 85 reads the report data that has been processed and written by the report data processing unit 84 into the pipe connecting the report conversion filter 103b and the report output filter 103c, and then, based on the report data thus read, generates the report data adapted to a user-designated output method, such as, e.g., printing on a sheet or electronic mail transmission. "To generate report data adapted to an output method" herein refers to, for example, a procedure for generating the physical report data 32 from the logical report data 31 (i.e., data conversion) using a module capable of interpreting the language in which the logical report data 31 is described (such as a PDL interpreter capable of interpreting PDL in a case where the logical report data 31 is describe in PDL) and converting it into a data format for the physical report data 32. Thereafter, the report data output unit 85 outputs the generated report data as the physical report data 32 via various device control units in the device control layer 105.

Thus, in the present embodiment, the report generation control unit 81 delivers the logical report data 31 acquired from the report data generation unit 83 to the next process step, which is the report data processing unit 84, thereby requesting the processing of the report data. In response, the report data processing unit 84 processes the logical report data 31 in accordance with user-designated settings concerning the report output format, and delivers the processed report data to the next process step, i.e., the report data output unit 85. The report data output unit 85 then converts the processed report data into report data adapted to a user-designated report output method, and then outputs the generated report data as the physical report data 32 via various device control units in the device control layer 105.

In this way, various information managed by the apparatus can be output in the form of a report in an output format and by an output method requested by a user.

Figure 14:
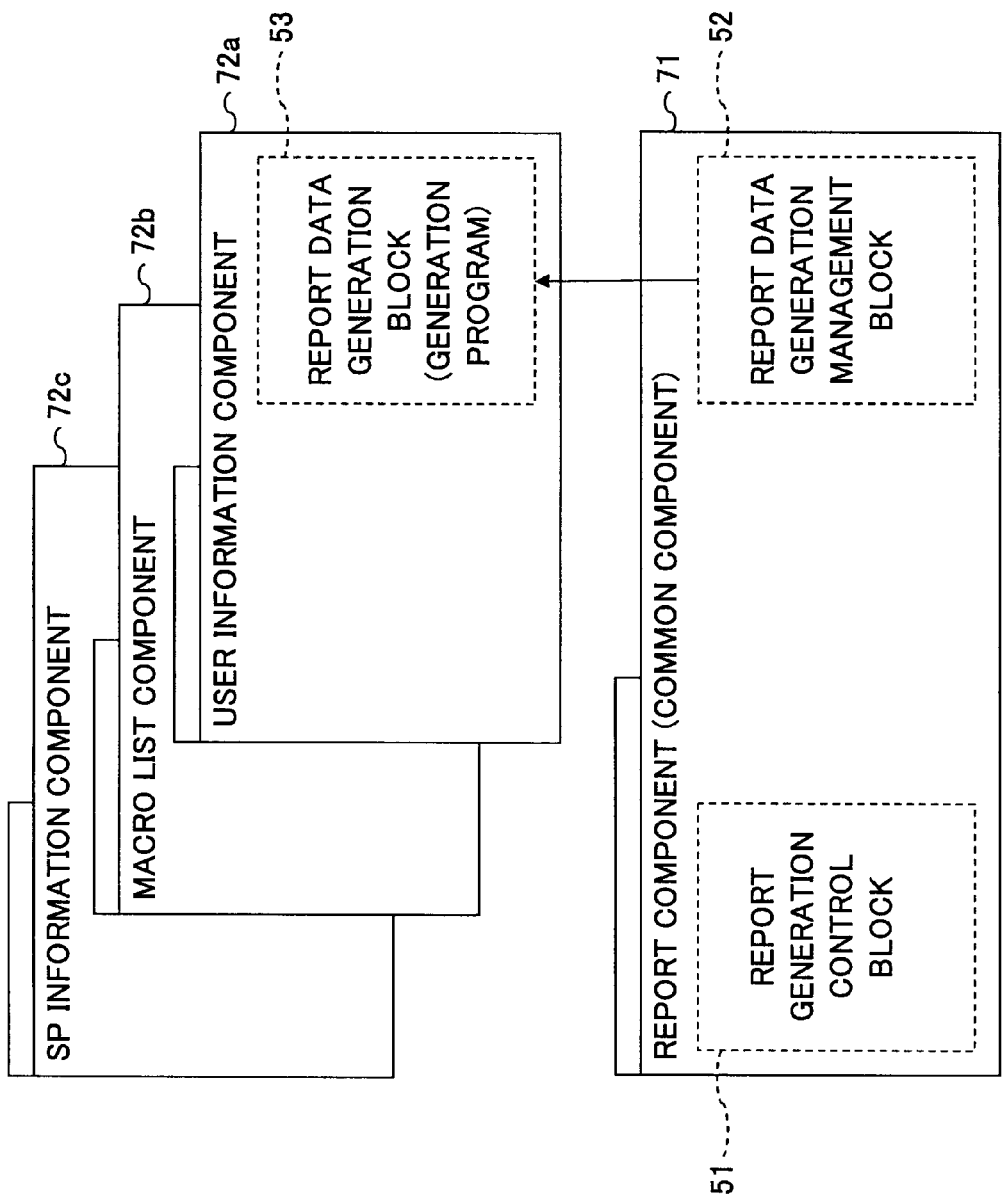
FIG. 14 shows various components for realizing the report output function according to the first embodiment.

The individual units described above providing the major functions of the present embodiment are implemented in appropriate layers of the software configuration shown in FIG. 6 as components (i.e., parts of a program) for realizing the report output function. FIG. 14 shows an example of the components for realizing the report output function of the present embodiment.

As shown in FIG. 14, output functions that can be shared, such as the report generation control block 51 and the report data generation management block 52, are grouped into a report component 71 (common component). Functions including the report data generation block 53 (report data generation program) are also grouped into components (user information component 72a, Macro list component 72b, and SP information component, for example) for generating each report, based on the content of a report output, such as "User information," "Macro list," or "SP information (i.e., in units of report information). Such report output-specific components are configured to plug into the common report component 71 to provide each report output function. To "plug-in" herein means that the function of a part of the user information component 72a, Macro list component 72b, or SP information component 72c, i.e., the report data generation block 53 (report data generation program), is added to the report component 71. Upon plugging-in of a component having a report generation function, the report data generation management block 52 registers the report identifying information (such as a report title) and a report data generation program identified by the identifying information, in the report data generation program management table 52t.

In this way, a report output function that has ceased to be used can be readily deleted and a new report output function can be readily added (i.e., the report output function can be readily extended). Thus, in accordance with the functional configuration and implementation of the present embodiment, when a report output is desired for an information item among various information managed by the apparatus, the report data generation block 53 (report data generation program) associated with that information item is prepared and, as a component 72 having the function for generating the desired report, plugged into the report component 71. Thus, any information item can be output in the form of a report.

This capability of outputting any information item among various information managed by the apparatus in the form of a report using the report data generation block 53 (report data generation program) adapted to a desired information item is described with reference to FIG. 15.

Figure 15:
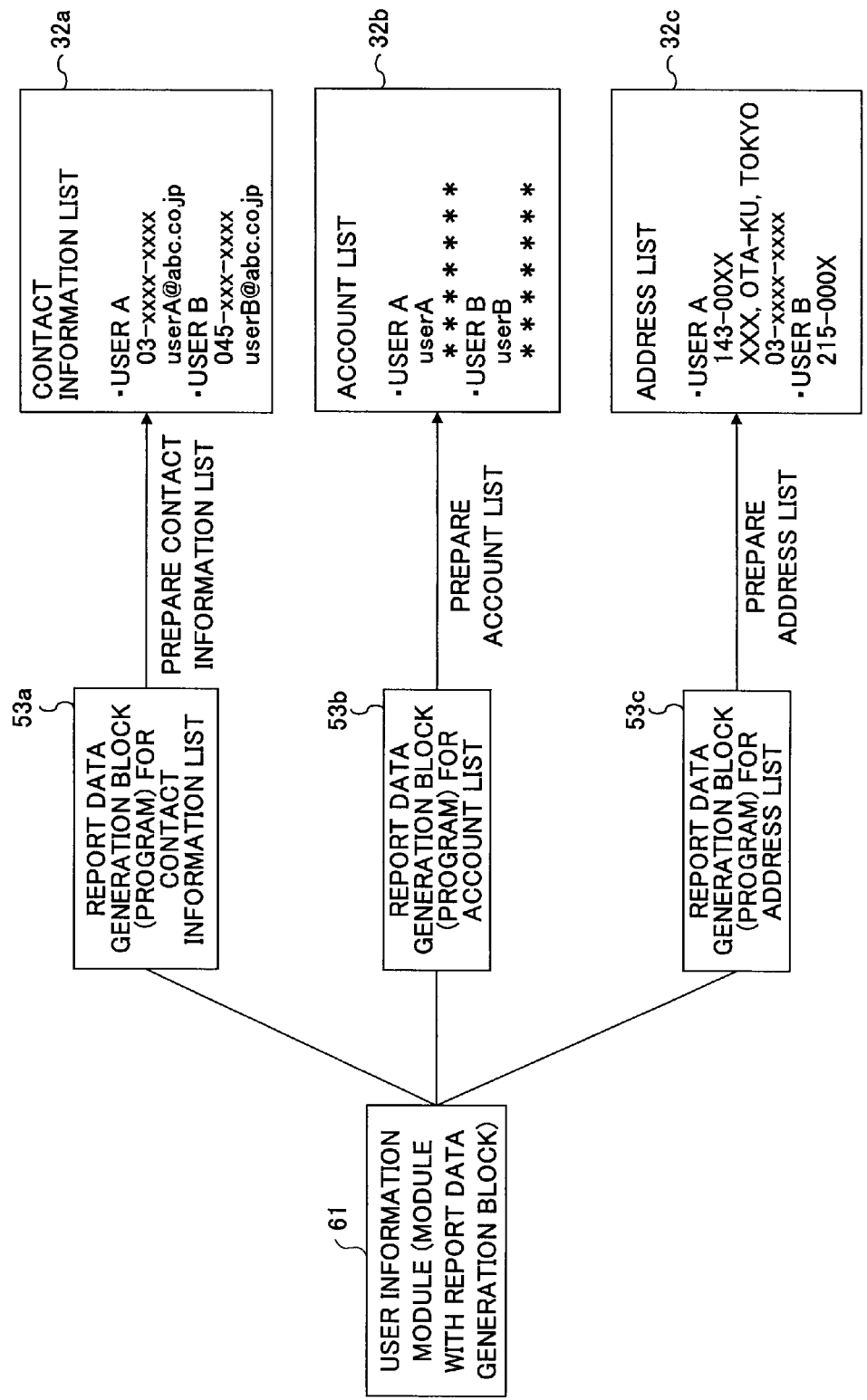
FIG. 15 illustrates how plural report outputs can be produced based on user information according to the first embodiment.

FIG. 15 illustrates how plural kinds of report can be output based on user information in accordance with the present embodiment.

As shown in FIG. 15, report data generation blocks 53a to 53c (report data generation programs) are provided to generate the logical report data 31 adapted to the content of each desired report output (physical report data 32), such as a contact information list providing user e-mail addresses as information items; an account list showing user accounts as information items; and an address list showing user addresses as information items, among other user information. Using these report data generation blocks, a contact information list 32a, an account list 32b, and an address list 32c can be output in the form of a report. Thus, the module 61 (user information module) for the output of a user information report can utilize plural report data generation blocks 53 (report data generation programs), so that plural kinds of report output can be realized. In other words, a report adapted to its content (or purpose) can be generated.

<Procedure Performed by Each Unit for Realizing Each Major Function>

A specific procedure performed by each unit for each major function described above is described with reference to FIGS. 16 and 17.

Figure 16:
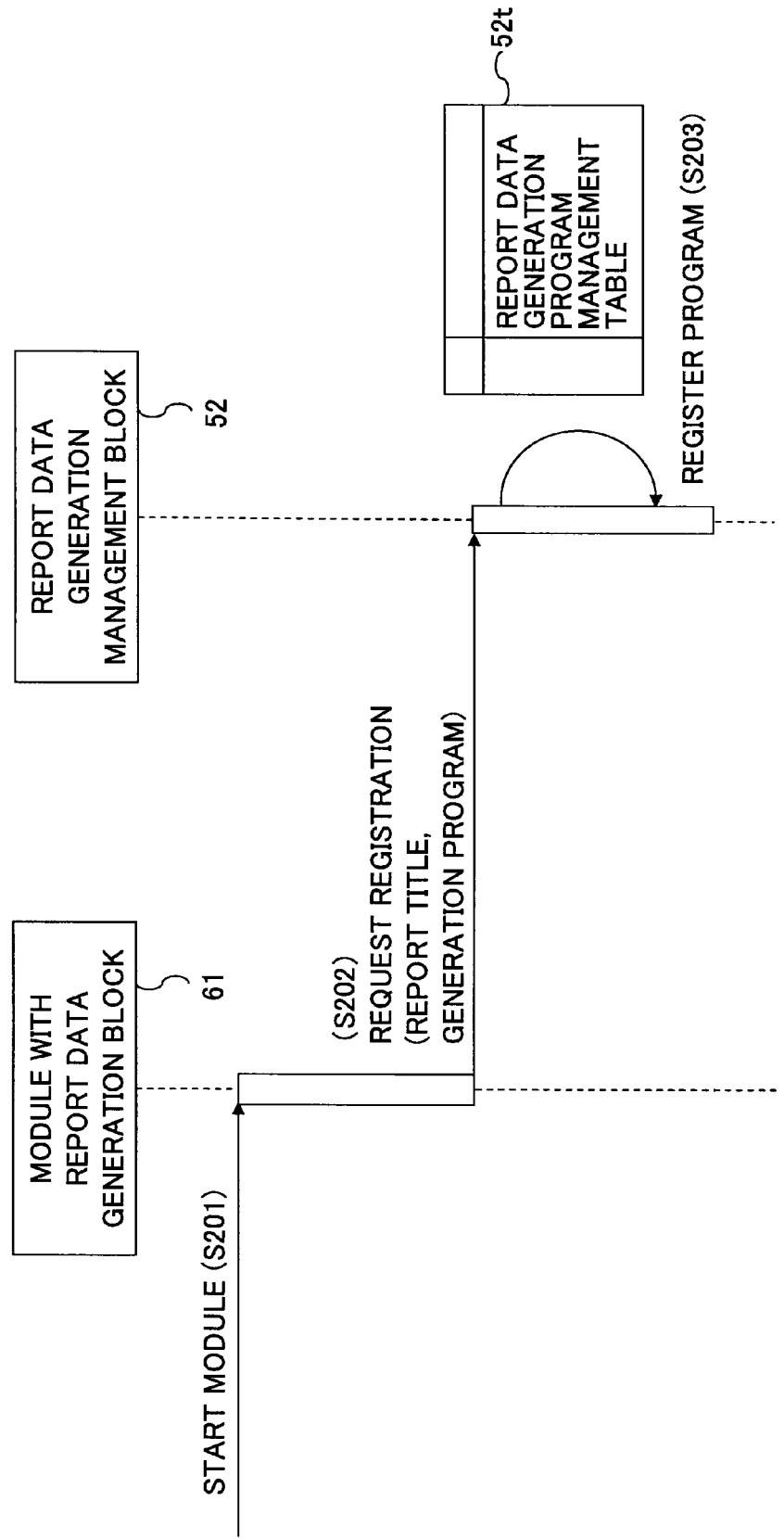
FIG. 16 shows a sequence chart of a procedure for registering a report data generation program according to the first embodiment.

FIG. 16 shows a sequence chart illustrating an example of the procedure performed for registering a report data generation program according to the first embodiment of the invention. The illustrated procedure involves the report generation management block 52 registering a report data generation program in the report data generation program management table 52t upon start or installation of the program.

Following the reception of a start request (S201), the module 61, which includes the report data generation block 53 (report data generation program) is started. The module then makes a request to the report data generation management block 52 to register the report data generation program in the report data generation program management table 52t (S202). The request is made using as parameters the report identifying information (such as a report title) and the report data generation program. The report data generation program corresponds to the report data generation block 53 for generating the logical report data 31 adapted to the content of the report that is identified from the identifying information. The report data generation management block 52, i.e., the report data generation management unit 82, registers the report identifying information that has been received and the report data generation program identified from the identifying information, in the report data generation program management table 52t, thereby updating the management table (S203).

FIG. 17 shows a sequence chart illustrating an example of a procedure for outputting a report in accordance with the first embodiment of the invention.

The user interface (UI) 41 receives the user-designated report identifying information (such as a report title) and various settings concerning, e.g., the report output format and output method. Based on such received settings, the interface makes a report generation request to the report generation control block 51 (S301).

In response to the report generation request, the report generation control block 51, i.e., the report generation control unit 81, sends a request to the report data generation management block 52 for the acquisition of a report data generation program from the report data generation program management table 52t for generating the logical report data 31 for the desired report output, using as a parameter the report identifying information that has been acquired upon reception of the report generation request (S302).

In response to the request from the report generation control block 51, the report data generation management block 52, i.e., the report data generation management unit 82, searches the report data generation program management table 52t based on the report identifying information acquired upon reception of the request, and then transmits a retrieved report data generation program (S303).

The report generation control block 51, i.e., the report generation control unit 81, then starts the report data generation program transmitted from the report data generation management block 52 (thereby making a request for generating the logical report data 31) (S304).

The report data generation program, functioning as the report data generation unit 83, then collects the latest variable data (actual values) corresponding to the information items of which the report consists, in accordance with the generation request from the report generation control block 51 (S305). The report data generation program then converts the fixed data, such as the information items of the report which are stored in advance, and the collected variable data into a general-purpose data format by a predetermined report data generation procedure, thereby generating the logical report data 31 (S306). Thereafter, the report data generation unit 83 transmits the generated logical report data 31 to the report generation control block 51 (S307).

The report generation control block 51, i.e., the report generation control unit 81, writes the logical report data 31 generated by the report data generation unit 83 into a pipe that the report data processing block 54 can read for data processing, and also makes a request for the processing of the logical report data 31 in accordance with an output format (S308).

The report data processing block 54, i.e., the report data processing unit 84, reads the logical report data 31 from the pipe (S309), and processes the logical report data 31 in accordance with a user-designated report output format. The report data processing unit 84 then writes the processed report data into a pipe that the report data output block 55 can read for the data output processing step, and also makes a request for the output of physical report data 32 adapted to a designated output method. In response, the report data output block 55, i.e., the report data output unit 85, reads the processed report data from the pipe, and outputs the physical report data 32 adapted to the user-designated report output method (S310).

<Example of Operation of the Report Output Function>

A specific example of the operation of the above-described procedures is described with reference to FIG. 18.

FIG. 18 shows a sequence chart illustrating an example of transmission of billing information via electronic mail according to the first embodiment of the invention.

In the example shown in FIG. 18, billing information that is accumulated daily in a multifunction peripheral (MFP) is listed in a report in PDF format, which that is transmitted to a person in charge of billing at 8 p.m. on Friday every week.

An information processing apparatus 200 comprises a timer with which the user-designated day and time, i.e., 8 p.m. of every Friday, is detected (S401). The report generation control block 51 receives the result of such detection, together with various settings designated by the user in advance, such as "Billing information list"; "PDF electronic data"; and "electronic mail output" (S402). Based on the setting information "billing information list," a request for the acquisition of a relevant report data generation program is made to the report data generation management block 52 (S403).

In response to the request from the report generation control block 51, the report data generation management block 52, i.e., the report data generation management unit 82, searches the report data generation program management table 52t based on the information "billing information list" acquired upon reception of the request, and responds with (i.e., transmits) a retrieved report data generation program for generating the logical report data 31 for the billing information list (S404).

The report generation control block 51, i.e., the report generation control unit 81, then starts the transmitted report data generation program (i.e., requests the generation of the logical report data 31)(S405).

The started report data generation program, functioning as the report data generation unit 83, collects the latest variable data (actual values) corresponding to the items of billing information (S406), and converts the collected variable data and the fixed data retained in advance, such as the information items of the billing information, into a general-purpose data format in a predetermined report data generation procedure, thereby generating the logical report data 31 for the billing information list (S407). Thereafter, the report data generation unit 83 responds with (i.e., transmits) the generated logical report data 31 for the billing information list to the report generation control block 51 (S408).

The report generation control block 51, i.e., the report generation control unit 81, then writes the logical report data 31 for the billing information list generated by the report data generation unit 83 into a pipe that the report data processing block 54 can read for the data processing step, and makes a request for the processing of the logical report data 31 in accordance with a designated output format (S409).

The report data processing block 54, i.e., the report data processing unit 84, then reads the logical report data 31 for the billing information list from the pipe (S410) and processes the logical report data 31 into a PDF format as designated by the user (S411). The report data processing unit 84 then writes the processed report data into a pipe that the report data output block 55 can read for the data output process step, and makes a request for the output of the physical report data 32 by the designated output method. Thereafter, the report data output block 55, i.e., the report data output unit 85, reads the processed report data from the pipe, and attaches the physical report data 32, which is adapted to the billing information list in PDF format, to an electronic mail text in accordance with the user-designated report output method "electronic mail output." The mail is then automatically sent to the mail address of predetermined billing personnel (S412).

SUMMARY

Thus, in the information processing apparatus 200 according to the first embodiment of the present invention, based on the report identifying information (such as a report title) designated via the user interface (UI) 41, the report generation control unit 81 acquires an appropriate report data generation program from the report data generation program management table 52t managed by the report data generation management unit 82. The report generation control unit 81 then starts the acquired report data generation program and causes it to function as the report data generation unit 83, and makes a request for generating a report. In response, the report data generation unit 83 converts the fixed data, which is retained in advance, and the variable data, which has been updated by the acquisition of information, into general-purpose data format in a predetermined report data generation procedure, thereby generating the logical report data 31, which is then transmitted to the report generation control unit 81. The report generation control unit 81 then delivers the logical report data 31 to the next process step, i.e., the report data processing unit 84.

The delivery of the logical report data 31 to the report data processing unit 84 also entails a request for the processing of the data. Thus, the report data processing unit 84 processes the logical report data 31 in accordance with the user-designated settings concerning the report output format, and delivers the thus processed report data to the report data output unit 85 for the next process step. The report data output unit 85 renders the report data adapted to the user-designated report output method, and outputs the adapted report data, i.e., the physical report data 32, via various device control units in the device control layer 105.

In this way, the information processing apparatus 200 can generate the physical report data 32 based on the logical report data 31, which is general-purpose data not dependent on any particular report output format or output method.

Thus, in the information processing apparatus 200 according to the first embodiment of the present invention, various information managed by the apparatus can be output in the form of a report in a user-requested output format and by a user-requested output method.

In accordance with the first embodiment of the invention, the image processing apparatus 100, which is capable of implementing and carrying out similar functional features as those of the information processing apparatus 200, can provide similar advantageous effects as those described above with regard to the information processing apparatus 200.

The report output function provided by the first embodiment of the present invention can also be provided by a computer executing a program encoding each of the procedures described with reference to the first embodiment in a programming language adapted to the particular operating environment (platform). Such program for executing the report output function of the first embodiment of the present invention can be stored in a computer-readable storage medium.

The foregoing embodiment is for illustrative purposes only and does not limit the scope of the present invention. Various modifications and changes may occur to those skilled in the art without departing from the scope of the invention defined in the claims.

The present application is based on the Japanese Priority Application No. 2006-325994 filed Dec. 1, 2006, the entire contents of which are hereby incorporated by reference.

What is claimed is:

1. An information processing apparatus configured to output information managed by the apparatus in the form of a report, the apparatus comprising:

a data input unit;

a data processing unit;

a data output unit; and an interface configured to receive settings for controlling the data input unit, the data processing unit, and the data output unit, the interface including a report content selection screen, an output format selection screen, and an output method selection screen, the report content selection screen is for selecting content of the report, the output format selection screen is for selecting a format of the report which is output from a plurality of output formats, and the output method selection screen is for selecting an output method of the report among output methods including transmitting electronic data, wherein:

the data input unit is configured to generate report data that is not dependent on any particular one of the output formats or the output methods including printing on a sheet and transmitting the electronic data, in accordance with report identifying information received via the report content selection screen of the interface, the data processing unit is configured to process the report data delivered from the data input unit in accordance with a report output format received via the output format selection screen of the interface, the data output unit is configured to output the report data processed by the data processing unit by a report output method received via the output method selection screen of the interface to transmit the report data electronically to a computer, the data input unit comprises a report data generation program for generating the report data not dependent on any particular output format or output method, in accordance with the report identifying information received via the interface, and the report data generation program is plugged into a report component so that any information can be output in a form of a report, the data input unit further comprises:
- a report data generation program management table in which the report identifying information and the report data generation program are associated with each other; and
- a report data generation management unit configured to register another report data generation program in the report data generation program management table, search the table, or delete one of the report data generation programs from the table.

2. The information processing apparatus according to claim 1, wherein the report data that is not dependent on any particular output format or output method comprises:
- fixed data associated with the report identifying information received via the interface as a setting for controlling the data input unit;
- variable data acquired from the information processing apparatus when a report output is produced; and
- tag data which, together with the fixed data and the variable data, makes up the report data.

3. The information processing apparatus according to claim 1, wherein the fixed data is set within one of the report data generation programs upon its registration in the report data generation program management table by the report data generation management unit.

4. The information processing apparatus according to claim 1, wherein the report data generation management unit registers another report data generation program in the report data generation program management table upon starting or installation of a module having the other report data generation program in the information processing apparatus.

5. The information processing apparatus according to claim 1, wherein the report data generation management unit deletes one of the report data generation programs from the report data generation program management table upon terminating or uninstallation of a module having the one of the report data generation programs from the information processing apparatus.

6. The information processing apparatus according to claim 1, wherein the data input unit comprises a report generation control unit which is configured to control processes involving making a request to the report data generation management unit to acquire one of the report data generation programs based on the report identifying information received via the interface, generating the report data not dependent on any particular output format or output method using the report data generation program acquired, and transmitting the generated report data to the data processing unit.

7. The information processing apparatus according to claim 6, wherein the report generation control unit is configured to make a request to the report data generation management unit to acquire one of the report data generation programs, based on the report identifying information received from the interface.

8. The information processing apparatus according to claim 6, wherein the report generation control unit is configured to acquire and start the report data generation program transmitted from the report data generation management unit.

9. The information processing apparatus according to claim 8, wherein the report data generation program, when started by the report generation control unit, is configured to transmit the generated report data to the report generation control unit.

10. The information processing apparatus according to claim 9, wherein the report generation control unit is configured to acquire the report data transmitted by the report data generation program and transmit the acquired report data to the data processing unit.

11. The information processing apparatus according to claim 6, wherein the report data generation management unit is configured to, in response to a request from the report generation control unit for acquiring one of the report data generation programs registered in the report data generation program management table, search the report data generation program management table based on the report identifying information transmitted from the report generation control unit, and transmit a relevant report data generation program that has been retrieved to the report generation control unit.

12. An image processing apparatus comprising the information processing apparatus according to claim 1.

13. The information processing apparatus according to claim 1, wherein:
- the output method selection screen is for selecting the output method from options including print, e-mail, and storage.

14. The information processing apparatus according to claim 1, wherein:
- the data output unit outputs the report data by e-mail.

15. An information processing method for outputting information managed by an information processing apparatus in the form of a report, the method comprising the steps of:
- entering, using an interface, settings which control generation of a report, the interface including a report content selection screen, an output format selection screen, and an output method selection screen, the report content selection screen is for selecting content of the report, the output format selection screen is for selecting a format of the report which is output from a plurality of output formats, and the output method selection screen is for selecting an output method of the report among output methods including transmitting electronic data,
- generating data that is not dependent on any particular one of the output formats or the output methods including printing on a sheet and transmitting the electronic data, in accordance with report identifying information received via the report content selection screen of the interface;
- processing the generated data in accordance with an output format received via the output format selection screen of the interface; and
- outputting the processed data by an output method received via the output method selecting screen of the interface to transmit the report data electronically to a computer, wherein:
- the generating comprises generating, using a report data generation program, the report data not dependent on any particular output format or output method, in accordance with the report identifying information received via the interface, the method further comprising:
- plugging the report data generation program into a report component so that any information can be output in a form of a report,
- associating a report data generation program management table in which the report identifying information and the report data generation program with each other; and
- registering another report data generation program in the report data generation program management table, searching the table, or deleting one of the report data generation programs from the table.

16. The information processing method according to claim 15, wherein:

the output method selection screen is for selecting the output method from options including print, e-mail, and storage.

17. A tangible computer readable medium which stores an information processing program for causing a computer to carry out a method of outputting information managed by an information processing apparatus in the form of a report, the method comprising the steps of:

entering, using an interface, settings which control generation of a report, the interface including a report content selection screen, an output format selection screen, and an output method selection screen, the report content selection screen is for selecting content of the report, the output format selection screen is for selecting a format of the report which is output from a plurality of output formats, and the output method selection screen is for selecting an output method of the report among output methods including transmitting electronic data, generating data that is not dependent on any particular one of the output formats or the output methods including printing on a sheet and transmitting the electronic data, in accordance with report identifying information received via the report content selection screen of the interface;

processing the generated data in accordance with an output format received via the output format selection screen of the interface; and outputting the processed data by an output method received via the output method selecting screen of the interface to transmit the report data electronically to a computer, wherein:

the generating comprises generating, using a report data generation program, the report data not dependent on any particular output format or output method, in accordance with the report identifying information received via the interface, the method further comprising:

plugging the report data generation program into a report component so that any information can be output in a form of a report, associating a report data generation program management table in which the report identifying information and the report data generation program with each other; and registering another report data generation program in the report data generation program management table, searching the table, or deleting one of the report data generation programs from the table.

18. The tangible computer readable medium according to claim 17, wherein:

the output method selection screen is for selecting the output method from options including print, e-mail, and storage.

* * * * *